United States Patent
Higuchi et al.

(10) Patent No.: US 11,032,370 B2
(45) Date of Patent: Jun. 8, 2021

(54) WIRELESS COMMUNICATIONS IN A VEHICULAR MACRO CLOUD

(71) Applicant: TOYOTA JIDOSHA KABUSHIKI KAISHA, Toyota (JP)

(72) Inventors: Takamasa Higuchi, Mountain View, CA (US); Onur Altintas, Mountain View, CA (US); Kentaro Oguchi, Mountain View, CA (US)

(*) Notice: Subject to any disclaimer, the term of this patent is extended or adjusted under 35 U.S.C. 154(b) by 39 days.

(21) Appl. No.: 16/190,235

(22) Filed: Nov. 14, 2018

(65) Prior Publication Data

US 2020/0153902 A1 May 14, 2020

(51) Int. Cl.
*H01L 29/08* (2006.01)
*H04L 29/08* (2006.01)
(Continued)

(52) U.S. Cl.
CPC ........... *H04L 67/1097* (2013.01); *H04W 4/44* (2018.02); *H04W 28/0215* (2013.01)

(58) Field of Classification Search
CPC ......... H04L 67/12; H04L 12/10; H04L 12/46; H04L 12/4625; H04L 12/56; H04L 45/74; H04L 47/2433; H04L 47/6275; H04L 47/76; H04L 47/821; H04L 49/25; H04L 63/04; H04L 67/025; H04L 69/08; H04L 69/22; H04L 1/008; H04L 29/06578; H04L 43/0811; H04L 43/0858; H04L 43/0876; H04L 45/12; H04L 51/02; H04L 61/2592; H04L 67/142; H04L 67/16; H04L 67/2809; H04L 67/32; H04L 69/18; H04L 12/1854; H04L 12/189; H04L 1/0061; H04L 27/2607; H04L 5/00; H04L 5/0007; H04L 5/0055; H04W 4/44; H04W 24/08; H04W 28/08; H04W 4/40; H04W 4/46; H04W 72/082; H04W 72/10; H04W 88/02;
(Continued)

(56) References Cited

U.S. PATENT DOCUMENTS 8,200,246 B2 * 6/2012 Khosravy .......... G06Q 30/0241
  455/456.3
8,340,902 B1 * 12/2012 Chiang ................ G05D 1/0044
  340/425.5
(Continued)

*Primary Examiner* — Greg C Bengzon
(74) *Attorney, Agent, or Firm* — Burbage Law, P.C.; Jon-Michael Burbage; Elizabeth Ruzich

(57) ABSTRACT

The disclosure includes embodiments for improving wireless communications among vehicular micro clouds within a vehicular macro cloud. In some embodiments, a method for a control plane (CP) node in a vehicular micro cloud includes: receiving a data request via a Vehicle-to-Everything (V2X) network; analyzing the data request using a control plane to select a target content provider for providing data content requested by the data request; using a data plane to process the data request; generating feedback data including one or more of result data describing a processing result of the data request and control-plane data; and modifying an operation of the CP node based on the feedback data so that a reduction including one or more of a latency of data delivery and a data packet loss for data requests processed by the CP node is achieved. The reduction improves over time as more feedback data is generated.

20 Claims, 13 Drawing Sheets

(51) Int. Cl.
*H04W 28/02* (2009.01)
*H04W 4/44* (2018.01)

(58) Field of Classification Search
CPC ... H04W 12/001; H04W 12/04; H04W 12/08;
H04W 28/0215; H04W 28/06; H04W
36/0009; H04W 36/08; H04W 40/02;
H04W 40/20; H04W 48/02; H04W 48/06;
H04W 48/16; H04W 48/18; H04W 4/00;
H04W 4/023; H04W 4/029; H04W 4/10;
H04W 4/38; H04W 52/12; H04W 52/143;
H04W 52/225; H04W 52/241; H04W
52/346; H04W 72/0406; H04W 72/042;
H04W 72/0493; H04W 76/45; H04W
80/02; H04W 84/005; H04W 84/12;
H04W 8/06; H04W 8/08; H04W 8/26;
H04W 92/18; H04W 36/0027; H04W
36/32; H04W 36/36; H04W 4/06; H04W
72/04; H04W 72/0446; H04W 72/046;
H04W 76/11; H04W 76/23; H04W 84/18;
H04W 88/04; B60R 16/023; B60R 16/03;
B60R 16/0315; G06K 9/00711; G06K
9/00791; G06K 9/00805; G06K 9/00818;
G06K 9/00825; G06K 9/3233; G08G
1/0112; G08G 1/092; G08G 1/096775;
G08G 1/096791; G08G 1/16; G08G 1/22;
H04B 3/3822; H04N 19/102; H04N
19/132; H04N 19/164; H04N 19/17;
H04N 7/181; H04N 7/183; B60W 30/165;
B60W 50/10; G05D 1/0027; G05D
1/0088; G05D 1/0285; G05D 1/0295;
G05D 1/0297; G05D 2201/0213; G06F
21/30; G06F 21/44; G06F 21/45; G06F
3/017; G06F 3/167; G06F 9/542; H04M
2207/18; H04M 3/42382

See application file for complete search history.

(56) References Cited

U.S. PATENT DOCUMENTS

| | | | | | |
|---|---|---|---|---|---|
| 8,432,808 | B1* | 4/2013 | Dankberg | | H04W 4/06 370/235 |
| 8,665,841 | B1* | 3/2014 | Goel | | H04L 69/22 370/327 |
| 8,718,797 | B1* | 5/2014 | Addepalli | | H04W 72/0406 700/17 |
| 9,036,509 | B1* | 5/2015 | Addepalli | | H04L 69/18 370/259 |
| 9,171,268 | B1* | 10/2015 | Penilla | | G06Q 10/02 |
| 9,294,960 | B2* | 3/2016 | Zhang | | H04W 72/04 |
| 9,467,515 | B1* | 10/2016 | Penilla | | G06F 3/04883 |
| 9,736,699 | B1* | 8/2017 | Rao | | H04W 4/80 |
| 9,927,816 | B2* | 3/2018 | Li | | G05D 1/0278 |
| 10,117,055 | B2* | 10/2018 | Frusina | | H04W 4/023 |
| 10,176,524 | B1* | 1/2019 | Brandmaier | | G06Q 40/08 |
| 10,205,508 | B1* | 2/2019 | Lindsley | | B64C 39/024 |
| 10,271,261 | B1* | 4/2019 | Lindsley | | B64C 39/024 |
| 10,425,619 | B2* | 9/2019 | Dellantoni | | B60R 1/00 |
| 10,552,458 | B2* | 2/2020 | Onishi | | H04L 51/046 |
| 2002/0009149 | A1* | 1/2002 | Rodriguez | | H04N 21/25808 375/240.25 |
| 2002/0191692 | A1* | 12/2002 | Fallon | | H03M 7/6094 375/240 |
| 2003/0053433 | A1* | 3/2003 | Chun | | H04L 12/66 370/338 |
| 2004/0230345 | A1* | 11/2004 | Tzamaloukas | | H04L 67/12 701/1 |
| 2005/0197748 | A1* | 9/2005 | Holst | | G06F 8/61 701/3 |
| 2007/0015485 | A1* | 1/2007 | DeBiasio | | H04B 1/082 455/345 |
| 2007/0104272 | A1* | 5/2007 | He | | H04N 19/134 375/240.12 |
| 2007/0198140 | A1* | 8/2007 | Mudalige | | G01S 5/0072 701/1 |
| 2008/0042815 | A1* | 2/2008 | Breed | | G08G 1/164 340/435 |
| 2009/0083390 | A1* | 3/2009 | Abu-Ghazaleh | | G06F 15/16 709/209 |
| 2009/0105932 | A1* | 4/2009 | Choi | | G08G 1/096716 701/117 |
| 2009/0189981 | A1* | 7/2009 | Siann | | H04N 7/183 348/143 |
| 2009/0231432 | A1* | 9/2009 | Grigsy | | G08G 1/161 348/149 |
| 2010/0064327 | A1* | 3/2010 | Lynch | | B64D 11/00155 725/76 |
| 2010/0070106 | A1* | 3/2010 | Okamoto | | H04L 67/12 701/1 |
| 2010/0235891 | A1* | 9/2010 | Oglesbee | | H04L 67/1095 726/5 |
| 2010/0256852 | A1* | 10/2010 | Mudalige | | G08G 1/163 701/24 |
| 2011/0090071 | A1* | 4/2011 | Platonov | | G06K 9/00818 340/425.5 |
| 2011/0193961 | A1* | 8/2011 | Peterson | | B60R 1/00 348/148 |
| 2011/0221901 | A1* | 9/2011 | Bai | | H04L 69/04 348/148 |
| 2011/0235627 | A1* | 9/2011 | Wang | | H04L 63/0428 370/338 |
| 2012/0106446 | A1* | 5/2012 | Yousefi | | G06F 1/26 370/328 |
| 2012/0108163 | A1* | 5/2012 | Bai | | H04L 12/1854 455/3.06 |
| 2012/0149346 | A1* | 6/2012 | Akhtar | | H04L 67/2847 455/414.2 |
| 2012/0149417 | A1* | 6/2012 | Akhtar | | G06F 16/9574 455/509 |
| 2012/0151073 | A1* | 6/2012 | Bai | | G06F 16/9574 709/228 |
| 2012/0158910 | A1* | 6/2012 | Cooper | | H04L 67/1097 709/219 |
| 2012/0173900 | A1* | 7/2012 | Diab | | H04L 12/10 713/310 |
| 2012/0173905 | A1* | 7/2012 | Diab | | H04L 12/66 713/320 |
| 2012/0182935 | A1* | 7/2012 | Addepalli | | H04W 40/24 370/328 |
| 2012/0218412 | A1* | 8/2012 | Dellantoni | | G01C 21/3679 348/148 |
| 2012/0271908 | A1* | 10/2012 | Luna | | H04L 67/2833 709/216 |
| 2012/0320824 | A1* | 12/2012 | Bari | | H04W 76/10 370/328 |
| 2013/0041574 | A1* | 2/2013 | Koshizen | | G08G 1/0112 701/118 |
| 2013/0073775 | A1* | 3/2013 | Wade | | G06F 13/4022 710/316 |
| 2013/0145482 | A1* | 6/2013 | Ricci | | B60W 40/08 726/28 |
| 2013/0198802 | A1* | 8/2013 | Ricci | | H04L 67/12 726/1 |
| 2013/0201316 | A1* | 8/2013 | Binder | | H04L 67/12 348/77 |
| 2013/0238777 | A1* | 9/2013 | Raleigh | | H04L 67/1097 709/223 |
| 2013/0268157 | A1* | 10/2013 | Ok | | B61L 15/0081 701/31.4 |
| 2013/0278440 | A1* | 10/2013 | Rubin | | G08G 9/02 340/903 |
| 2013/0279392 | A1* | 10/2013 | Rubin | | H04W 4/40 370/312 |
| 2013/0279491 | A1* | 10/2013 | Rubin | | G08G 1/166 370/347 |

(56) References Cited

U.S. PATENT DOCUMENTS

| | | | |
|---|---|---|---|
| 2013/0282238 A1* | 10/2013 | Ricci | H04L 67/12 701/41 |
| 2013/0322516 A1* | 12/2013 | Zhang | H04N 19/30 375/240.02 |
| 2014/0108609 A1* | 4/2014 | Vu Duong | H04L 45/12 709/217 |
| 2014/0143839 A1* | 5/2014 | Ricci | H04N 21/25816 726/4 |
| 2014/0195102 A1* | 7/2014 | Nathanson | G07C 5/0808 701/31.4 |
| 2014/0222971 A1* | 8/2014 | Cooper | H04L 67/1097 709/219 |
| 2015/0215738 A1* | 7/2015 | Frusina | H04W 4/023 455/426.1 |
| 2015/0221141 A1* | 8/2015 | Negritto | H04L 67/025 701/31.5 |
| 2015/0271452 A1* | 9/2015 | Guzman | G07C 5/0866 348/113 |
| 2015/0281374 A1* | 10/2015 | Petersen | H04L 67/12 709/223 |
| 2015/0379114 A1* | 12/2015 | Onishi | H04L 67/42 707/737 |
| 2016/0019651 A1* | 1/2016 | Grimm | G06Q 40/08 705/4 |
| 2016/0026179 A1* | 1/2016 | Humenay | G05D 1/0022 701/2 |
| 2016/0077789 A1* | 3/2016 | Hampiholi | G06F 3/165 709/203 |
| 2016/0093216 A1* | 3/2016 | Lee | G06Q 10/063114 340/870.11 |
| 2016/0191861 A1* | 6/2016 | Tinskey | H04L 67/12 348/148 |
| 2016/0203652 A1* | 7/2016 | Throop | G07C 5/008 701/36 |
| 2016/0234654 A1* | 8/2016 | Tosa | G08G 1/096791 |
| 2016/0267335 A1* | 9/2016 | Hampiholi | G06F 3/013 |
| 2016/0285863 A1* | 9/2016 | Canavor | H04L 63/0823 |
| 2016/0294707 A1* | 10/2016 | Chen | H04L 47/24 |
| 2016/0301598 A1* | 10/2016 | Strijkers | G06F 9/5072 |
| 2016/0364232 A1* | 12/2016 | Moeller | H04L 67/34 |
| 2016/0371075 A1* | 12/2016 | Moeller | G06F 8/654 |
| 2016/0371077 A1* | 12/2016 | Moeller | G06F 8/654 |
| 2017/0006404 A1* | 1/2017 | Hordys | H04W 4/50 |
| 2017/0092018 A1* | 3/2017 | Throop | G07C 5/008 |
| 2017/0099658 A1* | 4/2017 | Shattil | H04B 7/024 |
| 2017/0113664 A1* | 4/2017 | Nix | G06F 11/3072 |
| 2017/0127246 A1* | 5/2017 | Zou | G01C 21/26 |
| 2017/0134906 A1* | 5/2017 | Yoo | H04W 4/027 |
| 2017/0161282 A1* | 6/2017 | Kemme | H04L 67/10 |
| 2017/0206238 A1* | 7/2017 | Coutinho | G06F 16/215 |
| 2017/0215123 A1* | 7/2017 | Miranda d'Orey | H04W 4/046 |
| 2017/0222913 A1* | 8/2017 | Chia | G08G 1/052 |
| 2017/0227972 A1* | 8/2017 | Sabau | G08G 1/22 |
| 2017/0287237 A1* | 10/2017 | Koenig | G07C 5/008 |
| 2017/0289864 A1* | 10/2017 | Narasimha | H04W 36/0027 |
| 2017/0293296 A1* | 10/2017 | Stenneth | G01C 21/3438 |
| 2017/0313332 A1* | 11/2017 | Paget | H04N 7/183 |
| 2017/0331921 A1* | 11/2017 | Moreira da Mota | H04W 4/40 |
| 2017/0332352 A1* | 11/2017 | Sheng | H04L 67/12 |
| 2017/0339622 A1* | 11/2017 | Condeixa | H04L 43/04 |
| 2017/0345231 A1* | 11/2017 | Kumabe | H04W 4/46 |
| 2017/0347236 A1* | 11/2017 | Frusina | H04M 1/72572 |
| 2017/0353574 A1* | 12/2017 | Lavi | H04L 67/2876 |
| 2017/0359412 A1* | 12/2017 | Haebler | H04L 67/06 |
| 2018/0027037 A1* | 1/2018 | Watson | H04L 67/1097 709/219 |
| 2018/0027389 A1* | 1/2018 | Shirakata | H04W 4/20 455/426.1 |
| 2018/0042023 A1* | 2/2018 | Sheng | H04W 48/12 |
| 2018/0049220 A1* | 2/2018 | Patil | H04W 72/0426 |
| 2018/0050800 A1* | 2/2018 | Boykin | H04N 5/23206 |
| 2018/0077068 A1* | 3/2018 | Dhanabalan | H04L 47/2433 |
| 2018/0084511 A1* | 3/2018 | Wu | H04L 67/12 |
| 2018/0092065 A1* | 3/2018 | Sheng | H04W 74/006 |
| 2018/0103108 A1* | 4/2018 | Kim | H04L 69/16 |
| 2018/0115616 A1* | 4/2018 | Srinivasan | H04L 67/141 |
| 2018/0115791 A1* | 4/2018 | Resch | H04L 67/2847 |
| 2018/0144621 A1* | 5/2018 | Arai | G06Q 50/10 |
| 2018/0146041 A1* | 5/2018 | Moustafa | H04L 45/74 |
| 2018/0146471 A1* | 5/2018 | Xu | H04L 67/12 |
| 2018/0192059 A1* | 7/2018 | Yang | G01S 17/86 |
| 2018/0211546 A1* | 7/2018 | Smartt | H04W 4/023 |
| 2018/0227726 A1* | 8/2018 | Futaki | H04W 88/08 |
| 2018/0234889 A1* | 8/2018 | Baghel | H04W 72/06 |
| 2018/0241852 A1* | 8/2018 | Maluf | H04L 12/40013 |
| 2018/0249444 A1* | 8/2018 | Sorrentino | H04W 72/02 |
| 2018/0261020 A1* | 9/2018 | Petousis | G07C 5/008 |
| 2018/0279259 A1* | 9/2018 | Gulati | H04W 72/06 |
| 2018/0300964 A1* | 10/2018 | Lakshamanan | G05D 1/0088 |
| 2018/0317067 A1* | 11/2018 | Ameixieira | H04L 67/16 |
| 2018/0324882 A1* | 11/2018 | Gulati | H04B 7/15542 |
| 2018/0336780 A1* | 11/2018 | Ran | G08G 1/017 |
| 2018/0343587 A1* | 11/2018 | Condeixa | H04W 4/027 |
| 2018/0367261 A1* | 12/2018 | Gonzalves Serrano | H04L 1/1854 |
| 2018/0367731 A1* | 12/2018 | Gatti | H04N 5/23238 |
| 2018/0373268 A1* | 12/2018 | Antunes Marques Esteves | H04W 4/023 |
| 2018/0373980 A1* | 12/2018 | Huval | G06K 9/6254 |
| 2018/0375939 A1* | 12/2018 | Magalhaes de Matos | H04L 29/08945 |
| 2018/0376305 A1* | 12/2018 | Ramalho de Oliveira | H04W 4/44 |
| 2018/0376306 A1* | 12/2018 | Ramalho de Oliveira | H04W 4/44 |
| 2018/0376357 A1* | 12/2018 | Tavares Coutinho | H04L 67/10 |
| 2019/0007812 A1* | 1/2019 | Shilov | H04W 4/021 |
| 2019/0014446 A1* | 1/2019 | Gade | G08G 1/164 |
| 2019/0025813 A1* | 1/2019 | Cella | G05B 23/0221 |
| 2019/0026796 A1* | 1/2019 | Dinis da Silva de Carvalho | G06Q 30/04 |
| 2019/0028529 A1* | 1/2019 | Katsavounidis | H04L 65/4084 |
| 2019/0037430 A1* | 1/2019 | Lee | H04W 4/40 |
| 2019/0045336 A1* | 2/2019 | Chang | H04W 4/40 |
| 2019/0045507 A1* | 2/2019 | Sorrentino | H04W 72/1268 |
| 2019/0049262 A1* | 2/2019 | Grimm | G01C 21/3492 |
| 2019/0051159 A1* | 2/2019 | Wang | H04W 4/46 |
| 2019/0053253 A1* | 2/2019 | Jung | H04W 72/1242 |
| 2019/0059071 A1* | 2/2019 | Khoryaev | H04W 64/006 |
| 2019/0068434 A1* | 2/2019 | Moreira da Mota | H04L 41/0806 |
| 2019/0068697 A1* | 2/2019 | Darby, III | G06F 9/5072 |
| 2019/0093619 A1* | 3/2019 | Vadlamani | F02N 11/0833 |
| 2019/0096244 A1* | 3/2019 | Guruva Reddiar | G08G 1/092 |
| 2019/0098602 A1* | 3/2019 | Costa | H04W 64/003 |
| 2019/0120964 A1* | 4/2019 | Luo | G01S 17/931 |
| 2019/0123915 A1* | 4/2019 | Simplicio, Jr. | H04L 9/14 |
| 2019/0124015 A1* | 4/2019 | Loehr | H04L 67/322 |
| 2019/0132414 A1* | 5/2019 | Bongaarts | G06K 9/6274 |
| 2019/0132819 A1* | 5/2019 | Tseng | H04L 5/14 |
| 2019/0149417 A1* | 5/2019 | Augusto Lopes | H04L 41/0886 370/254 |
| 2019/0149429 A1* | 5/2019 | Stocker | H04L 67/104 709/225 |
| 2019/0182639 A1* | 6/2019 | Basu Mallick | H04W 4/40 |
| 2019/0182643 A1* | 6/2019 | Kim | H04W 16/28 |
| 2019/0182840 A1* | 6/2019 | Feng | H04W 72/06 |
| 2019/0188541 A1* | 6/2019 | Wang | G01C 3/08 |
| 2019/0223010 A1* | 7/2019 | Keranen | H04L 69/22 |
| 2019/0241198 A1* | 8/2019 | Mori | B60W 50/14 |
| 2019/0245927 A1* | 8/2019 | Auerbach | H04W 4/46 |
| 2019/0258251 A1* | 8/2019 | Ditty | G05D 1/0274 |
| 2019/0260485 A1* | 8/2019 | Byun | H04L 25/02 |
| 2019/0281119 A1* | 9/2019 | Stenneth | G08G 1/0145 |
| 2019/0286120 A1* | 9/2019 | Stenneth | G06Q 10/06315 |
| 2019/0288908 A1* | 9/2019 | Lee | H04W 76/14 |
| 2019/0306678 A1* | 10/2019 | Byun | H04L 5/0055 |
| 2019/0313375 A1* | 10/2019 | Loehr | H04W 72/04 |
| 2019/0349173 A1* | 11/2019 | Kim | H04L 5/0007 |
| 2019/0362479 A1* | 11/2019 | Shibata | H04N 5/232 |
| 2019/0364402 A1* | 11/2019 | Lee | H04W 4/90 |

(56) References Cited

U.S. PATENT DOCUMENTS

| | | | |
|---|---|---|---|
| 2019/0364492 A1* | 11/2019 | Azizi | H04W 52/0264 |
| 2020/0007823 A1* | 1/2020 | Ophir | H04N 19/17 |
| 2020/0021451 A1* | 1/2020 | Pinheiro | H04W 76/45 |
| 2020/0120458 A1* | 4/2020 | Aldana | H04W 28/22 |

* cited by examiner

DSRC DATA 600

- Vehicles and other client devices equipped with Dedicated Short Range Communication ("DSRC") transmit a Basic Safety Message ("BSM") at a regular interval.

- Each DSRC message includes the following DSRC data describing one or more of the following for the vehicle that originally sent the DSRC message:
    (1) GPS Data Describing the Location of the Vehicle, where the GPS Data may be so accurate that it describes the specific lane the Vehicle is traveling in;
    (2) Heading Data Describing the Direction of travel for the Vehicle;
    (3) Velocity Data Describing the Velocity of the Vehicle; and
    (4) Path History of Vehicle.

Figure 6A

DSRC DATA 600

Part 1
Vehicle Position Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type

Figure 6B

WIRELESS COMMUNICATIONS IN A VEHICULAR MACRO CLOUD

BACKGROUND

The specification relates to improving wireless communications among a set of vehicular micro clouds within a vehicular macro cloud.

Cloud computing aids in emerging services for connected and automated driving vehicles, since the vehicles are expected to exchange an increasing amount of data content with remote cloud servers (e.g., by way of cellular networks). Examples of such data content include a 3-dimensional road map for automated driving, content for infotainment services, etc. An increasing amount of network traffic between the vehicles and cloud servers may cause a significant load on radio access networks and underlying backbone networks.

Distributed data storage by a cluster of connected vehicles (i.e., a "vehicular micro cloud") is a promising solution to cope with the increasing network traffic generated for and by connected vehicles. Vehicles collaboratively store (or cache) data content in their onboard data storage devices and share the data content over vehicle-to-vehicle (V2V) networks as requested by other vehicles.

Vehicular micro clouds themselves can be further organized into vehicular macro clouds. In this way, the individual vehicular micro clouds can benefit from the computing resources of other vehicular micro clouds.

SUMMARY

Described are embodiments of a plane client installed in a control plane (CP) node that improves wireless communications among a set of vehicular micro clouds, where each of the vehicular micro clouds is a member of a vehicular macro cloud. The vehicular micro clouds each have a CP node with a plane client. Various plane clients in various CP nodes corresponding to the set of vehicular micro clouds can provide a mechanism for vehicular micro clouds to communicate with one another with less latency and data loss. By comparison, existing solutions for a vehicular macro cloud that needs V2V communications among the constituent vehicular micro clouds suffer from latency and data loss from the V2V communications.

In some embodiments described herein, assume that the set of vehicular micro clouds includes a first vehicular micro cloud and a second vehicular micro cloud without loss of generality. The plane clients are installed in the vehicles of the vehicular macro cloud. The plane clients include code and routines that are operable, when executed by one or more processors, to cause the one or more processors to establish (1) a distributed control plane and (2) a data plane among the first vehicular micro cloud and the second vehicular micro cloud, as well as any other vehicular micro cloud included in the vehicular macro cloud. For example, the distributed control plane is used for distributed Vehicle-to-Everything (V2X) (e.g., V2V) communications among the vehicular micro clouds and their member vehicles.

The plane clients included in the various vehicles of the vehicular micro clouds are operable to cooperate with one another to provide the functionality described herein. Each plane client includes code and routines that are operable to execute one or more of the following operations (1)-(11):

Operation (1): The plane clients of two or more CP nodes (e.g., two or more vehicles) in two or more vehicular micro clouds in different micro vehicular clouds establish (a) a distributed control plane and (b) a data plane among the two or more vehicular micro clouds.

Operation (2): A plane client of at least one CP node in each vehicular micro cloud generates status data. The status data of a vehicular micro cloud is digital data that describes one or more of the following types of status information: (a) a geographic location of the vehicular micro cloud; (b) a list of data files (i.e., a "content list") stored by the vehicular micro cloud and information described by each data file; (c) one or more computing resources available for this particular vehicular micro cloud; and (d) any request for data delivery, data replication or data recovery which this particular vehicular micro cloud may need to fulfill.

This operation (2), as well as any other operations executed by a CP node, may be executed by a single vehicle within a particular vehicular micro cloud or collaboratively executed by multiple vehicles within the particular vehicular micro cloud. Accordingly, a CP node for a particular vehicular micro cloud may be a single vehicle within that vehicular micro cloud or multiple vehicles within that vehicular micro cloud which work collaboratively to provide the functionality of the CP node for that particular vehicular micro cloud.

Operation (3): Periodically, the plane clients of the various CP nodes of a vehicular macro cloud exchange their status data with the other CP nodes of the vehicular macro cloud. The control plane established at operation (1) can be used for this exchange of status data.

Operation (4): The plane clients of the various CP nodes build status data structures including (and organizing) the status data received at operation (3), respectively.

Operation (5): If V2X (e.g., V2V) communications are used for operation (3), then the plane clients of the CP nodes respectively measure (a) a latency (i.e., described by "latency data") and (b) a packet delivery ratio (i.e., described by "packet data") while executing operation (4). Accordingly, after executing operation (5), each CP node potentially includes the following digital data which is collectively referred to as "resource data": (a) its own status data; (b) one or more status data structures including the status data of one or more other CP nodes; (c) latency data measured while exchanging status data at operation (4); and (d) packet data measured while exchanging the status data at operation (4).

Operation (6): A plane client of a vehicle (this vehicle is not necessarily a CP node or even a micro cloud member) wants to obtain data content from a vehicular micro cloud. Assume that the plane client of this vehicle generates a request for this data content and transmits this request to the first vehicular micro cloud which is nearby. The vehicle that executes this operation (6) may be referred to as a requester.

Operation (7): The plane client of the CP node for the first vehicular micro cloud of operation (6) retrieves the content list of the first vehicular micro cloud and determines whether the requested data content is stored by the first vehicular micro cloud. Operation (7) may proceed to a branch (7.a) or a branch (7.b).

At the branch (7.a), if the requested data content is stored by the first vehicular micro cloud, then the plane client of the CP node of the first vehicular micro cloud answers the data request of operation (6) with a V2X wireless message that includes the requested data content as its payload.

At the branch (7.b), if the requested data is not stored by the first vehicular micro cloud, then the plane client of the CP node of the first vehicular micro cloud analyzes its resource data to determine a most suitable provider for the requested data content. Assume that this most suitable provider is the second vehicular micro cloud. The plane client of the CP node of the first vehicular micro cloud uses the control plane established at operation (1) to forward the data request received at operation (6) to the CP node of the second vehicular micro cloud. The following operations (8)-(11) assume that the branch (7.b) is executed and not the branch (7.a).

Operation (8): Data prefetching may be performed. The plane clients of the CP nodes for the second vehicular micro cloud and the first vehicular micro cloud record "request data" that describes the data content which is requested by the requester at operation (6). In this way, the plane clients monitor the frequency with which particular data content is requested (the requested data content can be used for future computations to improve the performance with respect to reducing a latency and a data packet loss). The plane clients monitor the popularity of different data content and prefetch data content that is popular. In this way, when a requester requests popular data content, the branch (7.a) can be performed and it does not need to execute the branch (7.b) and the operations that follow the branch (7.b).

Operation (9): The plane client of the CP node for the second vehicular micro cloud provides the data content to the CP node for the first vehicular micro cloud.

Operation (10): Data caching can be performed. The plane clients of the CP nodes for the second vehicular micro cloud and the first vehicular micro cloud cache "content data" that includes the data content requested by the requester at operation (6). In this way the plane clients cache the content data for future requests that are received for this data content, thereby reducing a latency for these future requests as the branch 7(b) and its subsequent operations will not be needed in the future for requests for this same data content. This also reduces the risk of a data packet loss for these future requests.

Operation (11): The plane client of the CP node for the first vehicular micro cloud responds to the request of operation (6) by providing the requested data content to the requester.

In some embodiments, data replication and failure recovery, as enabled by the control plane, can also be performed.

The plane client(s) described herein can beneficially reduce a latency and data packet loss for wireless communications among various vehicular micro clouds which are constituents of a vehicular macro cloud. The plane client(s) described herein provides this functionality in part by establishing a distributed control plane. By comparison, there is no existing solution that reduces a latency and a data packet loss for wireless communications among various vehicular micro clouds using a distributed control plane.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for a first control plane (CP) node in a first vehicular micro cloud of a vehicular macro cloud, including: receiving a data request from a requester via a Vehicle-to-Everything (V2X) network; analyzing the data request using a control plane to select a target content provider for providing data content requested by the data request, where the target content provider is a second CP node in a second vehicular micro cloud of the vehicular macro cloud; using a data plane to process the data request; generating feedback data that includes one or more of result data describing a processing result of the data request and control-plane data associated with the control plane; and modifying an operation of the first CP node based on the feedback data so that a reduction including one or more of a latency of data delivery and a data packet loss for data requests processed by the first CP node is achieved, where the reduction improves over time as more feedback data is generated. Other embodiments of this aspect include corresponding computer systems, apparatus, and computer programs recorded on one or more computer storage devices, each configured to perform the actions of the methods.

Implementations may include one or more of the following features. The method where the data requests processed by the first CP node request for popular data content and modifying the operation of the first CP node based on the feedback data includes: analyzing the feedback data to determine one or more types of popular data content; and modifying an operation of a communication unit of the first CP node so that the communication unit prefetches and stores the one or more types of popular data content on the first CP node to achieve the reduction of the one or more of the latency of data delivery and the data packet loss for the data requests. The method where the data requests processed by the first CP node request for the data content again and modifying the operation of the first CP node based on the feedback data includes: modifying an operation of a communication unit of the first CP node so that the communication unit caches the data content on the first CP node based on the feedback data to achieve the reduction of the one or more of the latency of data delivery and the data packet loss for the data requests. The method further including: cooperating with at least the second CP node of the second vehicular micro cloud to establish the control plane and the data plane for the vehicular macro cloud, where the control plane is a distributed control plane and at least includes the first CP node of the first vehicular micro cloud and the second CP node of the second vehicular micro cloud. The method where: the control plane is used for handling a control type of distributed V2X communications among vehicular micro clouds of the vehicular macro cloud and member vehicles of the vehicular micro clouds; and the data plane is used for handling a data-delivery type of distributed V2X communications among the vehicular micro clouds of the vehicular macro cloud and the member vehicles of the vehicular micro clouds. The method further including generating first status data describing a status of the first vehicular micro cloud, and applying the control plane to perform a status-data exchange in the vehicular macro cloud, including: sending the first status data to the second CP node of the second vehicular micro cloud; and receiving second status data describing a status of the second vehicular micro cloud from the second CP node of the second vehicular micro cloud. The method where the first status data includes data describing one or more of: a geographic location of the first vehicular micro cloud; a content list describing a list of data files stored by the first vehicular micro cloud and information described by each data file; one or more computing resources available on the first vehicular micro cloud; one or more requests for data delivery that the first vehicular micro cloud needs to fulfill; one or more requests for data replication that the first vehicular micro cloud needs to fulfill; and one or more requests for data recovery that the first vehicular micro cloud needs to fulfill. The method further including measuring network data including latency data describing the latency of data delivery and packet data describing a packet delivery ratio based on the status-data exchange performed in the vehicular macro cloud and generating resource data of the first vehicular micro cloud that includes one or more of: the first status data of the first vehicular micro cloud; a status data structure including the second status data of the second vehicular micro cloud; and the network data including the latency data and the packet data. The method where analyzing the data request using the control plane to select the target content provider includes: retrieving a content list from first status data describing a status of the first vehicular micro cloud to determine whether the data content requested by the data request is stored by the first vehicular micro cloud; and responsive to the data content requested by the data request being not stored by the first vehicular micro cloud, analyzing resource data of the first vehicular micro cloud to determine that the target content provider is the second CP node of the second vehicular micro cloud. The method where the target content provider is the second CP node of the second vehicular micro cloud that satisfies one or more of: the second CP node stores the data content in a storage device of the second vehicular micro cloud; the second CP node has a smallest distance to the first CP node compared to one or more other CP nodes of one or more other vehicular micro clouds in the vehicular macro cloud; the second CP node has a smallest latency to the first CP node compared to the one or more other CP nodes; and the second CP node has a highest packet delivery ratio to the first CP node compared to the one or more other CP nodes. The method where using the data plane to process the data request includes: using the data plane to process the data request based on a decision made by the control plane. The method where the data request is forwarded to the target content provider over the control plane as a control message via the V2X network. The method where using the data plane to process the data request based on the decision made by the control plane includes: using the data plane to receive the data content from the target content provider via the V2X network; and using the data plane to forward the data content received from the target content provider to the requester via the V2X network. The method further including: monitoring a data replication triggering event in the first vehicular micro cloud; and responsive to occurrence of the data replication triggering event, replicating data of the first vehicular micro cloud to another vehicular micro cloud in the vehicular macro cloud. The method further including: determining that a set of data content is lost in the first vehicular micro cloud; and obtaining the set of data content from another vehicular micro cloud in the vehicular macro cloud to recover the set of data content in the first vehicular micro cloud. The method where the first CP node of the first vehicular micro cloud includes a vehicle of the first vehicular micro cloud or multiple vehicles of the first vehicular micro cloud that work collaboratively to provide functionality of the first CP node. Implementations of the described techniques may include hardware, a method or process, or computer software on a computer-accessible medium.

One general aspect includes a system including an onboard vehicle computer system of a connected vehicle that acts as a first control plane (CP) node of a first vehicular micro cloud in a vehicular macro cloud, including a communication unit, a processor and a non-transitory memory storing computer code which, when executed by the processor, causes the processor to: receive a data request from a requester via a Vehicle-to-Everything (V2X) network; analyze the data request using a control plane to select a target content provider for providing data content requested by the data request, where the target content provider is a second CP node in a second vehicular micro cloud of the vehicular macro cloud; use a data plane to process the data request; generate feedback data that includes one or more of result data describing a processing result of the data request and control-plane data associated with the control plane; and modify an operation of the first CP node based on the feedback data so that a reduction including one or more of a latency of data delivery and a data packet loss for data requests processed by the first CP node is achieved, where the reduction improves over time as more feedback data is generated. Other embodiments of this aspect include corresponding computer systems, apparatus, and computer programs recorded on one or more computer storage devices, each configured to perform the actions of the methods.

Implementations may include one or more of the following features. The system where the computer code, when executed by the processor, causes the processor further to: cooperate with at least the second CP node of the second vehicular micro cloud to establish the control plane and the data plane for the vehicular macro cloud, where the control plane is a distributed control plane and at least includes the first CP node of the first vehicular micro cloud and the second CP node of the second vehicular micro cloud. The system where: the control plane is used for handling a control type of distributed V2X communications among vehicular micro clouds of the vehicular macro cloud and member vehicles of the vehicular micro clouds; and the data plane is used for handling a data-delivery type of distributed V2X communications among the vehicular micro clouds of the vehicular macro cloud and the member vehicles of the vehicular micro clouds. Implementations of the described techniques may include hardware, a method or process, or computer software on a computer-accessible medium.

One general aspect includes a computer program product including a non-transitory memory storing computer-executable code that, when executed by a processor of a first control plane (CP) node in a first vehicular micro cloud of a vehicular macro cloud, causes the processor to: receive a data request from a requester via a Vehicle-to-Everything (V2X) network; analyze the data request using a control plane to select a target content provider for providing data content requested by the data request, where the target content provider is a second CP node in a second vehicular micro cloud of the vehicular macro cloud; use a data plane to process the data request; generate feedback data that includes one or more of result data describing a processing result of the data request and control-plane data associated with the control plane; and modify an operation of the first CP node based on the feedback data so that a reduction including one or more of a latency of data delivery and a data packet loss for data requests processed by the first CP node is achieved, where the reduction improves over time as more feedback data is generated. Other embodiments of this aspect include corresponding computer systems, apparatus, and computer programs recorded on one or more computer storage devices, each configured to perform the actions of the methods.

Implementations may include one or more of the following features. The computer program product where the computer code, when executed by the processor, causes the processor further to: cooperate with at least the second CP node of the second vehicular micro cloud to establish the control plane and the data plane for the vehicular macro cloud, where the control plane is a distributed control plane and at least includes the first CP node of the first vehicular micro cloud and the second CP node of the second vehicular micro cloud. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 6A and 6B are graphical representations illustrating example DSRC data according to some embodiments.

DETAILED DESCRIPTION

Figure 1A:
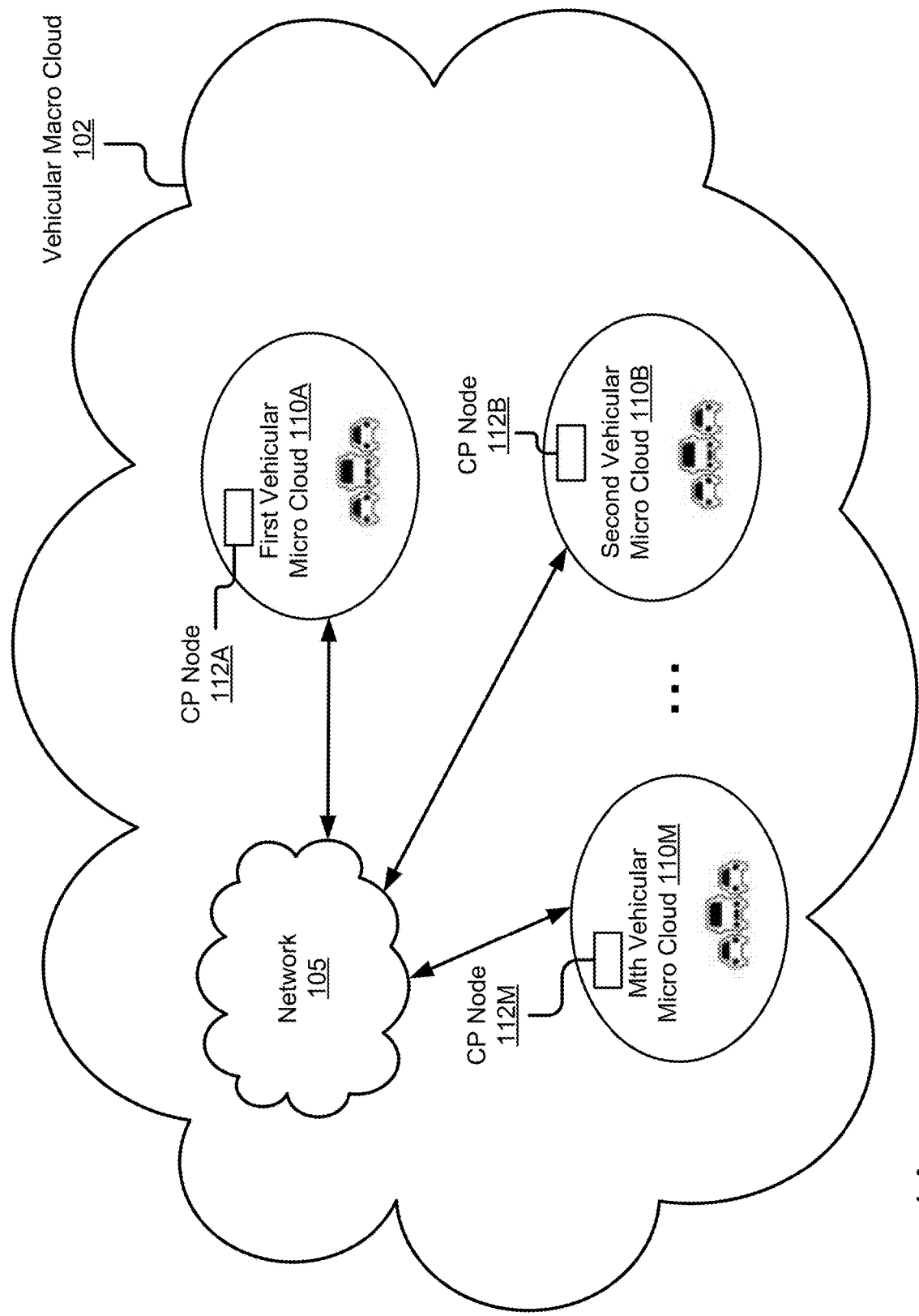
FIG. 1A is a block diagram illustrating an example vehicular macro cloud according to some embodiments.

Connected vehicles that are close by one another can form a vehicular micro cloud and are referred to as "micro cloud members" or "member vehicles" herein. The connected vehicles collaboratively perform computation, data storage, sensing, communication tasks and any combination thereof among the micro cloud members over V2X (e.g., V2V) networks, including, but not limited to, the following: (1) collaboratively performing resource-intensive computational tasks among the multiple member vehicles; (2) collaboratively keeping and updating data content among the multiple member vehicles; (3) collaboratively performing sensing of road conditions by on-board sensors of the multiple member vehicles; and (4) collaboratively downloading or uploading data content from or to a cloud server (or an edge server).

Using vehicular micro clouds in a vehicular macro cloud removes the need for the connected vehicles to access remote cloud servers or edge servers by vehicle-to-network (V2N) communications (e.g., by cellular networks) whenever they need to get access to data (e.g., high-definition road map for automated driving). Depending on mobility of the vehicular micro clouds, the vehicular micro clouds can be categorized into two types by way of examples: a stationary vehicular micro cloud; and a mobile vehicular micro cloud.

A stationary vehicular micro cloud can be tied to a certain geographical region (e.g., an intersection). A vehicle joins a stationary vehicular micro cloud when entering a pre-defined geographical region of the stationary vehicular micro cloud and leaves the stationary vehicular micro cloud when exiting from the pre-defined geographical region. When exiting from the pre-defined geographical region, the vehicle also handovers on-going tasks of the stationary vehicular micro cloud to other member vehicles. In some embodiments, parked vehicles can also be members of the stationary vehicular micro cloud.

In a mobile vehicular micro cloud, a member leader (e.g., a connected vehicle which acts as a leader in the vehicular micro cloud) can invite its neighboring vehicles to join the mobile vehicular micro cloud. Unlike the stationary vehicular micro cloud, the mobile vehicular micro cloud moves as the member leader moves. The member leader recruits other member vehicles into the mobile vehicular micro cloud and distributes sub-tasks to the other member vehicles for collaborative task execution.

Multiple vehicular micro clouds can be interconnected over V2X (e.g., V2V) networks to form a wide-scale vehicular macro cloud. Vehicles can request for data content and task execution from any vehicular micro clouds (or, any other vehicles) by accessing the vehicular micro clouds (or, the other vehicles) over V2X (e.g., V2V) networks. For example, a vehicular micro cloud performs a task upon being requested by a vehicle and sends a task-execution result back to the vehicle over the V2X (e.g., V2V) network. Also, the vehicular micro cloud can also send requested data to the vehicle over the V2X (e.g., V2V) networks, so that the vehicle retrieves the requested data from the vehicular micro cloud. In this way, service discovery and provisioning can be performed for a vehicular macro cloud.

In existing solutions, a latency of data delivery over V2V networks in the vehicular macro cloud can be high and reliability of the data delivery can be low. For example, if a content provider is far away from the requester vehicle, data forwarding over the V2V networks may incur a high latency, or even result in failure due to packet loss. Besides, risk of data loss from vehicular micro clouds is high. For example, data content kept in a vehicular micro cloud can be lost when the number of vehicles in a vehicular micro cloud decreases.

Embodiments of a plane client are described herein which improves wireless communications among a set of vehicular micro clouds over V2X communications. Examples of V2X communications described herein include, but are not limited to, one or more of the following: Dedicated Short Range Communication (DSRC) (including Basic Safety Messages (BSMs) and Pedestrian Safety Messages (PSMs), among other types of DSRC communication); Long-Term Evolution (LTE); millimeter wave (mmWave) communication; 3G; 4G; 5G; LTE-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a V2X wireless message described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message); a 5G-LTE message; and a millimeter wave message, etc.

Example Overview

Referring to FIG. 1A, depicted is an example vehicular macro cloud 102 which may include one or more vehicular micro clouds 110. Each vehicular micro cloud 110 includes a CP node 112. For example, the vehicular macro cloud 102 includes a first vehicular micro cloud 110A, a second vehicular micro cloud 110B, . . . , and an Mth vehicular micro cloud 110M, where M is a positive integer (M≥1). The first vehicular micro cloud 110A includes a CP node 112A, the second vehicular micro cloud 110B includes a CP node 112B, and the Mth vehicular micro cloud 110M includes a CP node 112M. The first vehicular micro cloud 110A, the second vehicular micro cloud 110B and the Mth vehicular micro cloud 110M are referred to herein as "vehicular micro cloud 110," collectively or individually. The first CP node 112A, the second CP node 112B and the Mth CP node 112M are referred to herein as "CP node 112," collectively or individually. These vehicular micro clouds 110 of the vehicular macro cloud 102 may be communicatively coupled to a network 105.

Although three vehicular micro clouds 110 and one network 105 are depicted in FIG. 1A, in practice the vehicular macro cloud 102 may include one or more vehicular micro clouds 110 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2I; LTE-V2X, LTE-D2D, VoLTE, LTE-5G or any other mobile data network or combination of mobile data networks. Further, the network 105 may include one or more IEEE 802.11 wireless networks.

In some embodiments, the network 105 includes a V2X network (e.g., a V2X wireless network). The V2X network is a communication network that enables entities such as the vehicular micro clouds 110 (e.g., CP nodes 112 and other members of the vehicular micro clouds) to wirelessly communicate with one another via one or more of the following: Wi-Fi; cellular communication including 3G, 4G, LTE, 5G, etc.; Dedicated Short Range Communication (DSRC); millimeter wave communication; etc.

Figure 1B:
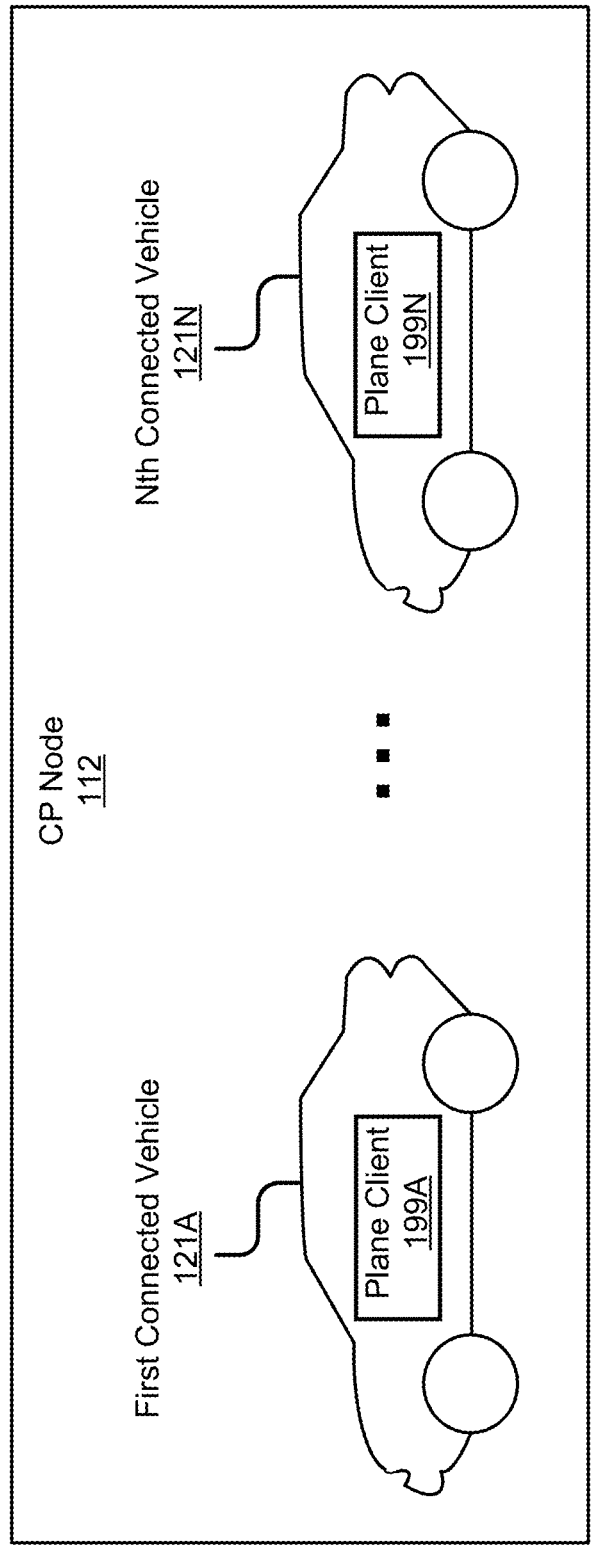
FIG. 1B is a block diagram illustrating an example CP node for a vehicular micro cloud according to some embodiments.

Referring to FIG. 1B, an example of the CP node 112 for a particular vehicular micro cloud 110 is depicted. The CP node 112 may include a single connected vehicle 121 or multiple connected vehicles 121 within the vehicular micro cloud 110 which work collaboratively to provide the functionality of the CP node for the vehicular micro cloud 110. For example, as depicted in FIG. 1B, the CP node 112 includes a first connected vehicle 121A, . . . , and an Nth connected vehicle 121N (which may be referred to herein as "connected vehicle 121," individually or collectively), where N is a positive integer (N≥1). Although two connected vehicles 121 are depicted in FIG. 1B, in practice the CP node 112 may include any number of connected vehicles 121 within the vehicular micro cloud 110.

Each connected vehicle 121 is installed with a plane client 199. For example, the first connected vehicle 121A includes a plane client 199A, and the Nth connected vehicle 121N includes a plane client 199N. The plane client 199A and the plane client 199N may be referred to herein as "plane client 199," individually or collectively.

In some embodiments, the plane client 199 of the connected vehicle 121 includes software that is operable, when executed by a processor of the connected vehicle 121, to cause the processor to execute one or more steps of a flow process 160 and methods 300 and 400 with reference to FIGS. 1E and 3-4C.

In some embodiments, the plane client 199 may be implemented using hardware including a field-programmable gate array ("FPGA") or an application-specific integrated circuit ("ASIC"). In some other embodiments, the plane client 199 may be implemented using a combination of hardware and software. The plane client 199 may be stored in a combination of the devices (e.g., vehicles or other devices), or in one of the devices.

The plane client 199 is further described below with reference to FIGS. 2-4C.

Figure 1C:
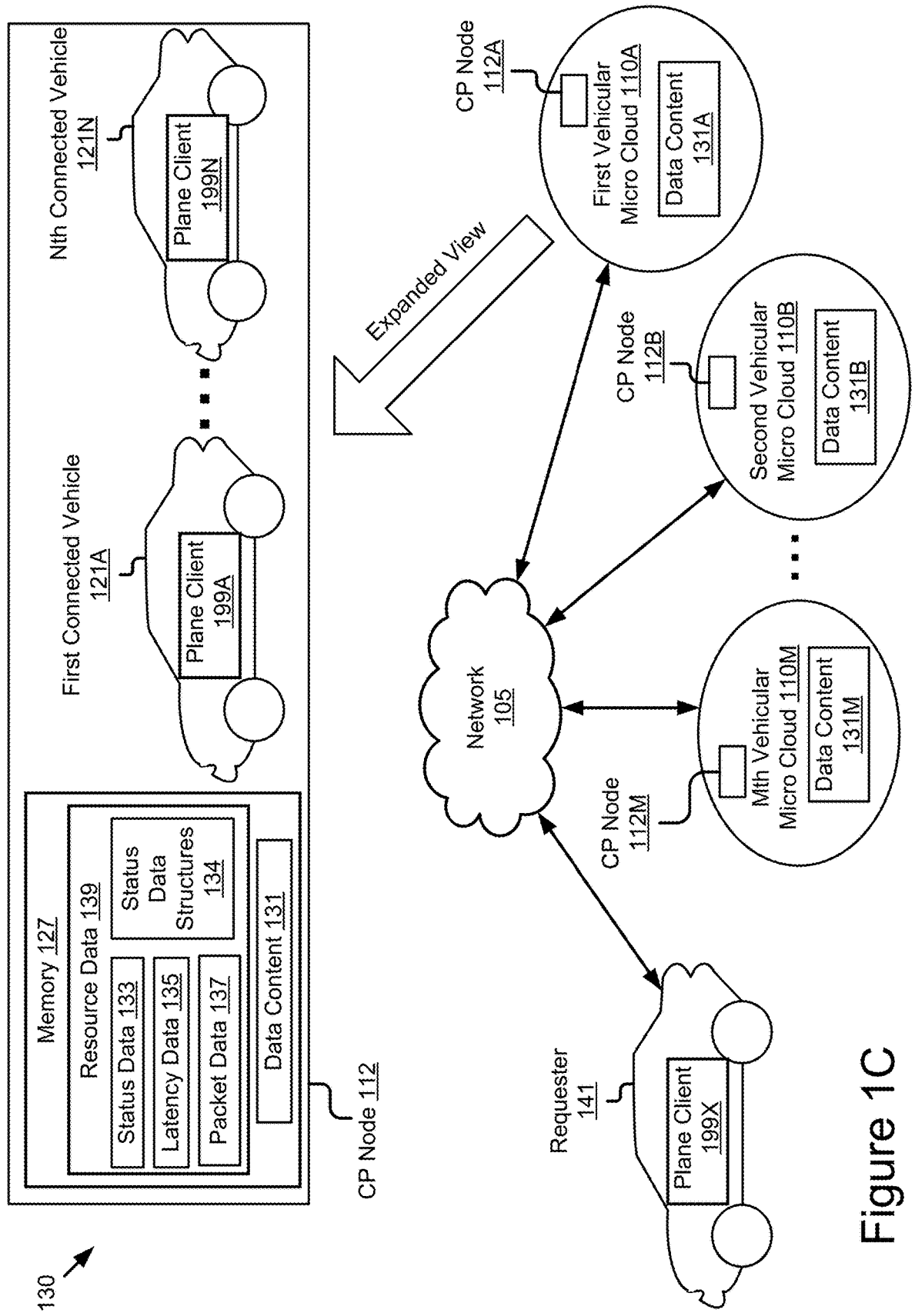
FIG. 1C is a block diagram illustrating an operating environment for a plane client according to some embodiments.

Referring to FIG. 1C, depicted is an operating environment 130 for the plane client 199. In addition to elements shown in FIGS. 1A and 1B, the operating environment 130 may additionally include a requester 141. The requester 141 may be installed with a plane client 199X (which is an instance of the plane client 199 and can also be referred to as the plane client 199 for simplicity and convenience of description). These elements of the operating environment 130 may be communicatively coupled to the network 105.

By way of examples, the first vehicular micro cloud 110A stores data content 131A, the second vehicular micro cloud 110B stores data content 131B, and the Mth vehicular micro cloud 110M stores data content 131M. The data content 131A, the data content 131B and the data content 131M may share at least a subset of data content in common with one another or may be entirely different from one another. The data content 131A, the data content 131B and the data content 131M may be referred to as "data content 131," individually or collectively.

The data content 131 may include one or more data files stored by a corresponding vehicular micro cloud. For example, the data content 131 may include, but is not limited to, audio content files (e.g., podcasts, music, voice recordings, etc.), video content files (e.g., movies, videos, etc.), map data files (e.g., high-definition maps for one or more cities, states, or countries) and any other types of data files.

In some embodiments, the data content 131 may include popular data content. In some examples, popularity of a piece of data content can be determined based on the number of requests that aim to retrieve this piece of data content. If the number of requests for this piece of data content exceeds a threshold, then this piece of data content is determined to be popular data content. Alternatively, or additionally, popularity of a piece of data content can be determined from web-based ratings or crowdsourcing. For example, top 100 songs on a music download website can be popular data content. Other examples of popular data content are possible.

An expanded view of a CP node 112 of a vehicular micro cloud 110 (e.g., the CP node 112A, 112B or 112M) is depicted in FIG. 1C. The CP node 112 includes, for example, one or more connected vehicles 121 (e.g., the first connected vehicle 121A, . . . , and the Nth connected vehicle 121N), a processor (not depicted in FIG. 1C) and a memory 127.

The memory 127 stores instructions or data that may be executed by the processor of the CP node 112. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The CP node 112 may include one or more memories 127.

The memory 127 may store one or more of the following elements: resource data 139; and the data content 131.

The resource data 139 includes one or more of the following elements: status data 133; status data structures 134; latency data 135; and packet data 137.

The status data 133 of the CP node 112 in the vehicular micro cloud 110 includes digital data describing status information of the vehicular micro cloud 110. For example, the status data includes data describing one or more of the following elements: a geographic location of the vehicular micro cloud (e.g., a stationary location of the vehicular micro cloud such as an intersection, or a location of a member leader in the vehicular micro cloud); a content list describing a list of data files stored by the vehicular micro cloud and information described by each data file; one or more computing resources (e.g., computing power, memory, network bandwidth, etc.) available on the vehicular micro cloud; one or more requests for data delivery that the vehicular micro cloud needs to fulfill; one or more requests for data replication that the vehicular micro cloud needs to fulfill; and one or more requests for data recovery that the vehicular micro cloud needs to fulfill.

The status data structures 134 of the CP node 112 include digital data describing status data of other CP nodes 112. For example, the CP node 112 receives one or more sets of status data from one or more other CP nodes 112 through a status-data exchange process and organizes the one or more sets of status data into one or more status data structures 134. In some embodiments, the one or more status data structures 134 also include one or more distances between the CP node 112 and the one or more other CP nodes 112, respectively. The one or more distances can also be measured during the status-data exchange process.

The latency data 135 includes digital data describing one or more latency values between the CP node 112 of the vehicular micro cloud 110 and one or more other CP nodes 112 of one or more other vehicular micro clouds 110. For example, the latency data 135 includes: (1) a first latency for data delivery between the vehicular micro cloud 110 and a first other vehicular micro cloud 110; (2) a second latency for data delivery between the vehicular micro cloud 110 and a second other vehicular micro cloud 110; and (3) any other latency for data delivery between the vehicular micro cloud 110 and any other vehicular micro cloud 110.

The packet data 137 includes digital data describing a packet delivery ratio (or, a packet loss rate) between the CP node 112 of the vehicular micro cloud 110 and one or more other CP nodes 112 of one or more other vehicular micro clouds 110. For example, the packet data 137 includes: (1) a first packet delivery ratio between the vehicular micro cloud 110 and a first other vehicular micro cloud 110; (2) a second packet delivery ratio between the vehicular micro cloud 110 and a second other vehicular micro cloud 110; and (3) any other packet delivery ratio between the vehicular micro cloud 110 and any other vehicular micro cloud 110.

The data content 131 is described above, and similar description will not be repeated here. In some embodiments, each micro cloud member stores data content that may be requested by other members of the same vehicular micro cloud 110 or members of other vehicular micro clouds 110. The requester 141 is a connected vehicle that requests data content from a micro cloud member. The requester 141 may or may not be a member of a vehicular micro cloud. For example, the requester 141 is a member vehicle of a particular vehicular micro cloud 110 in the vehicular macro cloud. In another example, the requester 141 is not a member vehicle of any vehicular micro cloud 110 in the vehicular macro cloud.

In some embodiments, one or more of the connected vehicle 121 and the requester 141 may be a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by an Advanced Driver Assistance System (ADAS) of a modern vehicle require positioning information that describes the geographic position of the vehicle with lane-level accuracy. In addition, the current standard for DSRC requires that the geographic position of the vehicle be described with lane-level accuracy.

As used herein, the words "geographic location," "location," "geographic position" and "position" refer to a latitude and longitude of an object such as the connected vehicle 121. The example embodiments described herein provide positioning information that describes a geographic position of a vehicle with an accuracy of at least plus or minus 1.5 meters in relation to the actual geographic position of the vehicle. Accordingly, the example embodiments described herein are able to describe the geographic position of the vehicle with lane-level accuracy or better.

The connected vehicle 121 and the requester 141 may include the same or similar elements. The connected vehicle 121 and the requester 141 may share a connection or association. For example, the connected vehicle 121 and the requester 141 each include a communication unit such that these vehicles are "connected vehicles," where the communication unit includes any hardware and software that is needed to enable the corresponding vehicle to communicate with other entities of the operating environment 130 via the network 105.

The connected vehicle 121 and the requester 141 may be any type of vehicle. The connected vehicle 121 and the requester 141 may be the same type of vehicle relative to one another or different types of vehicles relative to one another. For example, either the connected vehicle 121 or the requester 141 may include one of the following types of vehicles: a car; a truck; a sports utility vehicle; a bus; a semi-truck; a drone or any other roadway-based conveyance.

In some embodiments, one or more of the connected vehicle 121 and the requester 141 may include an autonomous vehicle or a semi-autonomous vehicle. For example, one or more of the connected vehicle 121 and the requester 141 may include one or more ADAS systems. The one or more ADAS systems may provide some or all of the functionality that provides autonomous functionality.

Figure 1D:
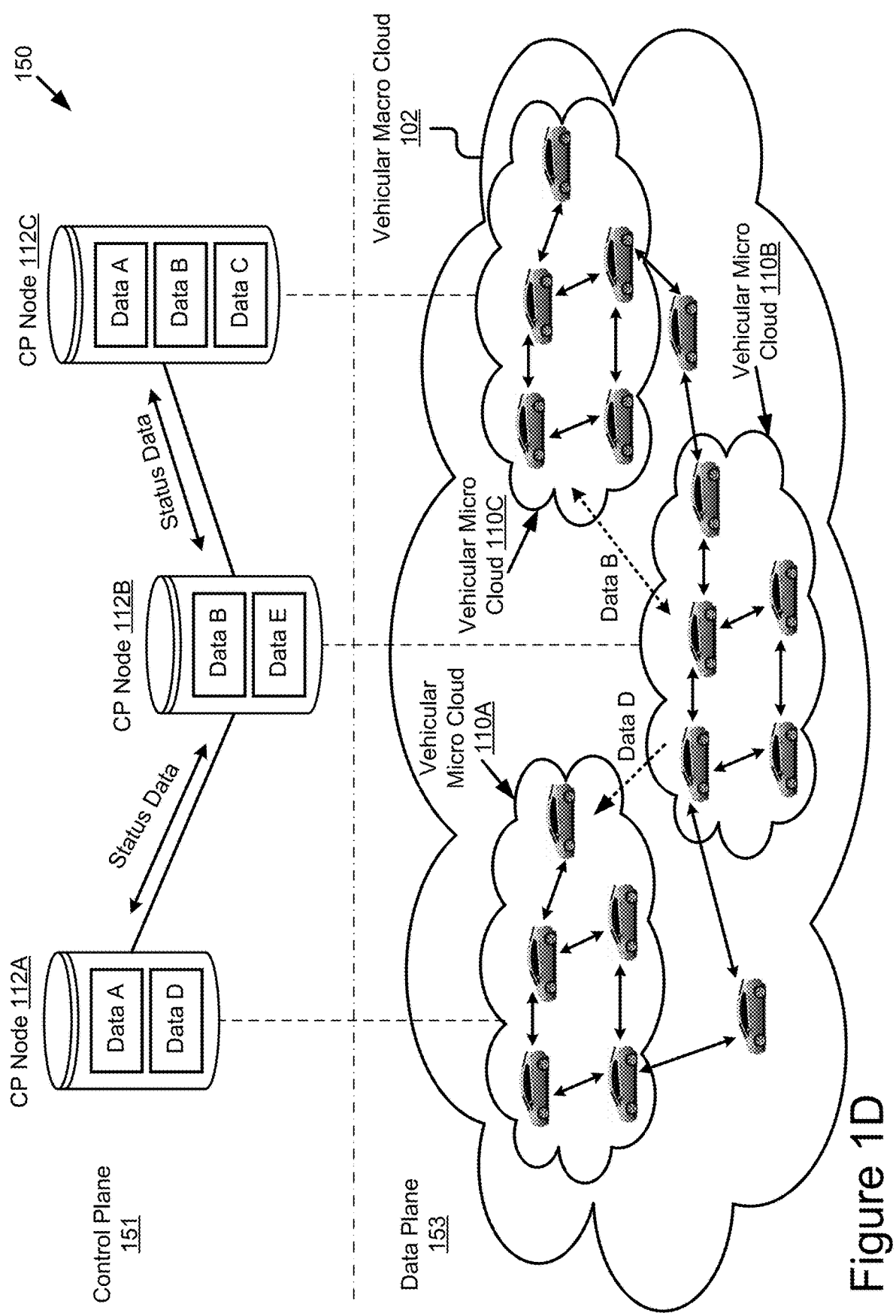
FIG. 1D is another block diagram illustrating an operating environment for a plane client according to some embodiments.

Referring to FIG. 1D, another operating environment 150 for the plane client 199 is shown according to some embodiments. In some scenarios, V2X communications between vehicular micro clouds 110 can be split into a control plane 151 and a data plane 153.

The control plane 151 is used for handling a control type of distributed V2X communications among the vehicular micro clouds 110 of the vehicular macro cloud 102 and among member vehicles of the vehicular micro clouds 110. For example, CP nodes 112 of the vehicular micro clouds 110 can communicate with each other over the control plane 151 to coordinate how to forward data content between the vehicular micro clouds 110. In a further example, the CP nodes 112 of the vehicular micro clouds 110 can communicate with each other over the control plane 151 to make a decision on how to forward data content between the vehicular micro clouds 110 over the data plane 153, where the decision includes, but is not limited to: a target content provider for providing the data content; a request-forward path to forward a data request to the target content provider; and a data-forward path to forward the data content from the target content provider to a requester, etc.

The data plane 153 is used for handling a data-delivery type of distributed V2X communications among the vehicular micro clouds 110 of the vehicular macro cloud 102 and the member vehicles of the vehicular micro clouds 110. For example, data content can be forwarded among the CP nodes 112 of the vehicular micro clouds 110 over the data plane 153 following a decision made on the control plane 151. In a further example, the data request can be forwarded to the target content provider over the control plane 151 as a control message according to a request-forward path determined on the control plane 151, and the data content can be forwarded to the requester over the data plane 153 as a data message according to a data-forward path determined on the control plane 151.

Example functionality provided by the data plane 153 includes forwarding data content over a V2X network (e.g., a V2V network) according to a decision made by the control plane 151. For example, a CP node 112 of a vehicular micro cloud 110 instructs one or more micro cloud members of the vehicular micro cloud 110 to send the data content toward a location of a destination vehicular micro cloud 110. The data content is forwarded over the V2X network (e.g., a multi-hop V2V network) by a geo-cast routing protocol.

Both the control plane 151 and the data plane 153 can be deployed in a V2X network. For example, both the control plane 151 and the data plane 153 are deployed in a V2V network. Optionally, it is also possible to enable the control plane 151 by Vehicle-to-Network (V2N) communications (e.g., cellular networks).

Turning to the control plane 151 again, in some embodiments the control plane 151 is used for efficient delivery of data content among the vehicular micro clouds 110. For example, the vehicular micro clouds 110 (or the CP nodes 112 of the vehicular micro clouds 110) that constitute a vehicular macro cloud 102 exchange their statuses (e.g., status data) with one another over the control plane 151. The status data of the vehicular micro clouds 110 is employed for intelligent decision on how to forward data content among the vehicular micro clouds 110. The vehicular micro clouds 110 (or the CP nodes 112 of the vehicular micro clouds 110) perform coordination with one another over the control plane 151 to facilitate efficient delivery of data content among themselves.

Example functionality provided by the control plane 151 includes, but is not limited to: forwarding a data request to a target content provider; conducting an intelligent selection of a target content provider responsive to receiving a data request from a requester; performing data prefetching from other vehicular micro clouds 110; performing data replication among the vehicular micro clouds 110; and performing cooperative data recovery among the vehicular micro clouds 110, etc.

For example, based on the status data exchanged over the control plane 151, a CP node 112 of a vehicular micro cloud 110 that receives a data request from a requester can identify a target content provider (e.g., a most suitable vehicular micro cloud). From the target content provider, the CP node 112 of the vehicular micro cloud 110 requests data content for the requester. In this way, a response time for the data request can be reduced. The selection of the target content provider is described further below with reference to FIG. 1E.

For example, with respect to performing data prefetching, a CP node 112 of a vehicular micro cloud 110 prefetches popular data content (e.g., an up-to-date version of popular data content) from one or more other vehicular micro clouds 110 before receiving data requests and stores the popular data content on a memory of the vehicular micro cloud 110. In this way, when a data request for any of the popular data content is received from a requester, the CP node 112 of the vehicular micro cloud 110 may respond to the data request directly by sending the requested popular data content to the requester. In this way, there is no need to select another target content provider because the CP node 112 of the vehicular micro cloud 110 itself is the most suitable content provider for the requested popular data content. Thus, a response time for the data request is reduced.

For example, with respect to performing data replication among the vehicular micro clouds, when the number of vehicles in a vehicular micro cloud 110 drops below a certain threshold, a CP node 112 of the vehicular micro cloud 110 can replicate its data content to close-by vehicular micro clouds 110 as backups. In this way, availability of the data content is improved.

For example, with respect to performing cooperative data recovery among the vehicular micro clouds 110, when a piece of data content is lost from a vehicular micro cloud 110, a CP node 112 of the vehicular micro cloud 110 obtains the piece of data content from a close-by vehicular micro cloud to recover it. In this way, availability of the data content is improved.

Each vehicular micro cloud 110 corresponds to a node on the control plane 151 (referred to as the CP node 112). The CP node 112 can be a virtual entity, with its functionality offered either by a member leader of the vehicular micro cloud 110 or by multiple member vehicles in a collaborative manner. For example, a single member vehicle of the vehicular micro cloud 110 can act as the CP node 112 for the vehicular micro cloud 110. Alternatively, multiple member vehicles of the vehicular micro cloud 110 that work collaboratively to provide the functionality of the CP node 112 can act as the CP node 112 collaboratively.

In some embodiments, the CP node 112 maintains a list of data contents that are kept in the vehicular micro cloud 110 and an amount of computation resources available in the vehicular micro cloud 110. The CP node 112 generates status data describing a status of the vehicular micro cloud 110 periodically, where the status data includes one or more of: a geographic location of the vehicular micro cloud 110; the list of data contents stored by the vehicular micro cloud 110; the amount of computation resources available on the vehicular micro cloud 110; one or more requests for data delivery that the vehicular micro cloud 110 needs to fulfill; one or more requests for data replication that the vehicular micro cloud 110 needs to fulfill; and one or more requests for data recovery that the vehicular micro cloud 110 needs to fulfill, etc.

The CP node 112 exchanges the status data with other CP nodes 112 of other vehicular micro clouds 110 periodically. Responsive to the control plane 151 being deployed in a V2X network (e.g., a V2V network), the CP node 112 also measures a latency and a packet delivery ratio of V2X communications (e.g., V2V communications) with other CP nodes 112 while exchanging the status data.

In an example depicted in FIG. 1D, three vehicular micro clouds 110A, 110B and 110C having CP nodes 112A, 112B and 112C respectively are illustrated in the vehicular macro cloud 102. Each of the vehicular micro clouds 110A, 110B and 110C includes multiple member vehicles.

On a level of the data plane 153, data content is forwarded between different vehicular micro clouds. For example, data B is communicated between the vehicular micro cloud 110B and the vehicular micro cloud 110C, so that both the vehicular micro cloud 110B and the vehicular micro cloud 110C store a copy of data B in their corresponding CP nodes 112B and 112C respectively. In another example, data D is forwarded to the vehicular micro cloud 110A via the vehicular micro cloud 110B, so that the vehicular micro cloud 110A stores a copy of data D in its corresponding CP node 112A.

On a level of the control plane 151, status data is exchanged among different CP nodes such as the CP nodes 112A, 112B and 112C. The CP node 112A includes a content list of the vehicular micro cloud 110A, including data A and data D. The CP node 112B includes a content list of the vehicular micro cloud 110B, including data B and data E. The CP node 112C includes a content list of the vehicular micro cloud 110C, including data A, data B and data C.

Figure 1E:
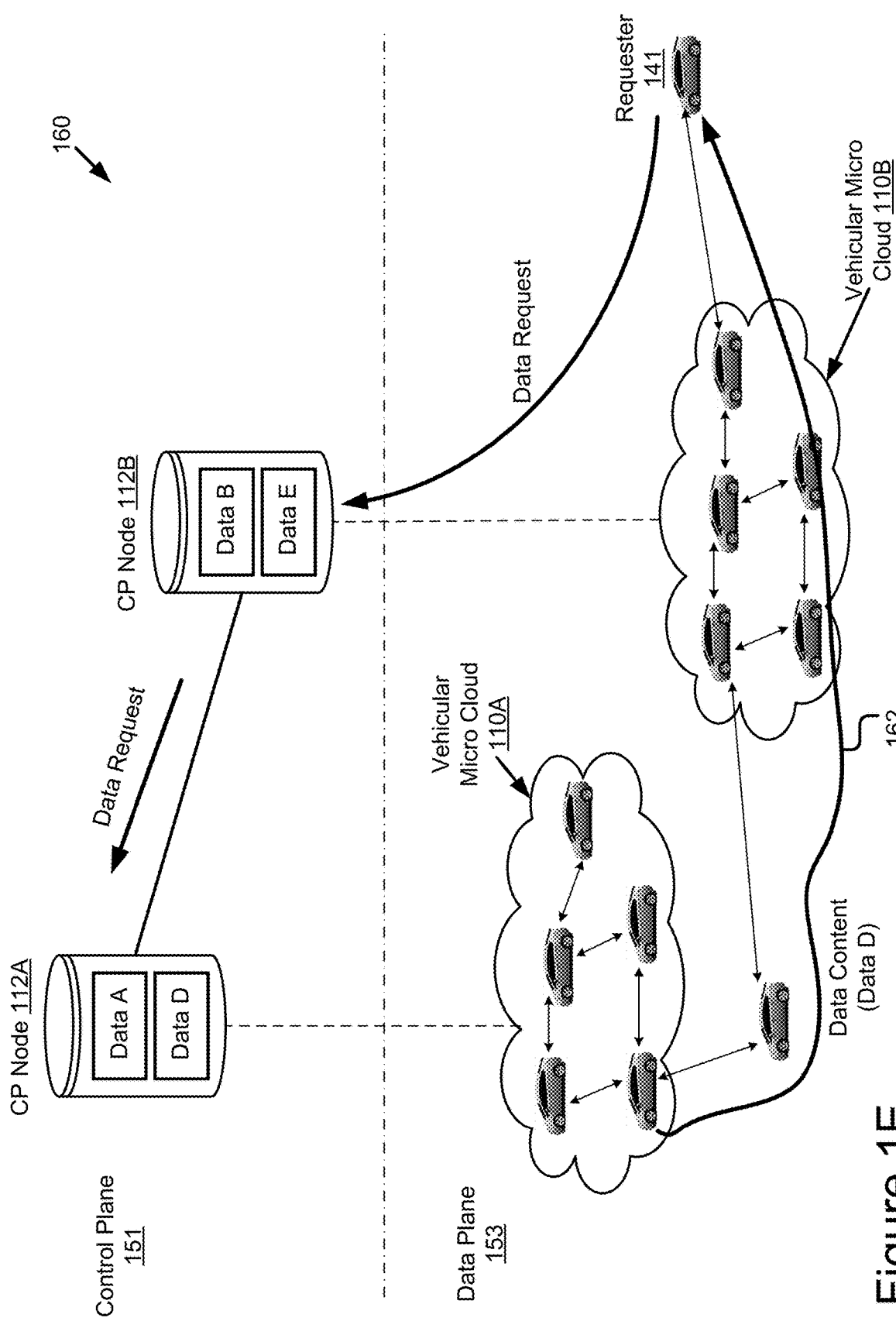
FIG. 1E is a block diagram illustrating an example flow process for a data request according to some embodiments.

Referring to FIG. 1E, an example flow process 160 for a data request is shown according to some embodiments. When a requester 141 needs a piece of data content, it can send a data request to a close-by vehicular micro cloud. Here, assume that the close-by vehicular micro cloud is the vehicular micro cloud 110B. On a level of the control plane 151, the CP node 112B of the vehicular micro cloud 110B determines whether the piece of data content is available on the vehicular micro cloud 110B.

Responsive to the piece of data content is available on the vehicular micro cloud 110B (e.g., this piece of data content is in a content list of the vehicular micro cloud 110B), the CP node 112B constructs a V2X wireless message including the piece of data content and sends the V2X wireless message to the requester 141 via a V2X network. For example, assume that the piece of data content requested by the requester 141 is data E. In this case, the CP node 112B responds directly to the requester 141 by sending a V2X wireless message including data E to the requester 141 via a V2X network.

If the piece of data content is not available on the vehicular micro cloud 110B (e.g., this piece of data content is not in a content list of the vehicular micro cloud 110B), the CP node 112B retrieves, from its resource data, one or more of the following: one or more status data structures describing one or more statuses of one or more other vehicular micro clouds; latency data; and packet data. The CP node 112B determines a target content provider based on one or more of: the one or more status data structures; the latency data; and the packet data.

In some embodiments, the target content provider is a CP node 112 of another vehicular micro cloud 110 that stores the piece of data content in a storage device of the other vehicular micro cloud 110. In some embodiments, the target content provider can be determined based on one or more of: (1) a distance to each candidate vehicular micro cloud (a smaller distance is better); (2) an average V2X (e.g., V2V) communication latency to each candidate vehicular micro cloud (a smaller latency is better); (3) a packet delivery ratio to or from each candidate vehicular micro cloud (a higher packet delivery ratio is better); and (4) any combination thereof. In this example, a candidate vehicular micro cloud is another vehicular micro cloud that can be a candidate for the target content provider.

Here in FIG. 1E, the CP node 112A of the vehicular micro cloud 110A is determined to be the target content provider, where the CP node 112A satisfies one or more of: (1) the CP node 112A stores a copy of the requested piece of data content; (2) the CP node 112A has a smallest distance to the CP node 112B compared to one or more other CP nodes 112 of one or more other vehicular micro clouds 110 in the vehicular macro cloud; (3) the CP node 112A has a smallest latency to the CP node 112B compared to the one or more other CP nodes 112; (4) the CP node 112A has a highest packet delivery ratio to the CP node 112B compared to the one or more other CP nodes 112; and (5) any combination thereof.

On the level of the control plane 151, the CP node 112B determines a request-forward path to forward the data request to the target content provider and forwards the data request to the target content provider (e.g., the CP node 112A) according to the request-forward path. For example, the request-forward path may be a path with a minimal number of hops on a V2X network, a path with a minimal latency on the V2X network, a path with a smallest distance on the V2X network or a path with a highest packet delivery ratio. Other examples of the request-forward path are possible.

In some embodiments, on the level of the control plane 151, the CP node 112B also determines a data-forward path for the target content provider (e.g., the CP node 112A) to forward the piece of data content to the requester 141. The data-forward path can be a path to forward the piece of data content to a vehicular micro cloud 110 from which the requester 141 likes to receive the piece of data content. For example, the data-forward path may be a path with a minimal number of hops on a V2X network, a path with a minimal latency on the V2X network, a path with a smallest distance on the V2X network or a path with a highest packet delivery ratio. Other examples of the data-forward path are possible. The data-forward path can be identical to, overlap with or be entirely different from the request-forward path.

Alternatively, on the level of the control plane 151, the data-forward path can be determined by the target content provider itself (e.g., the CP node 112A).

Next, on a level of the control plane 151, the CP node 112B forwards the data request to the CP node 112A. Responsive to receiving the data request, the CP node 112A determines that the piece of data content is available on the vehicular micro cloud 110A and generates a V2X wireless message including the piece of data content. On the level of the data plane 153, the CP node 112A forwards the V2X wireless message along the data-forward path to the requester 141. With reference to FIG. 1E, assume that the requested piece of data content is data D, and the CP node 112A forwards the data D to the requester 141 along a data-forward path 162 via the vehicular micro cloud 110B.

Example Computer System

Figure 2:
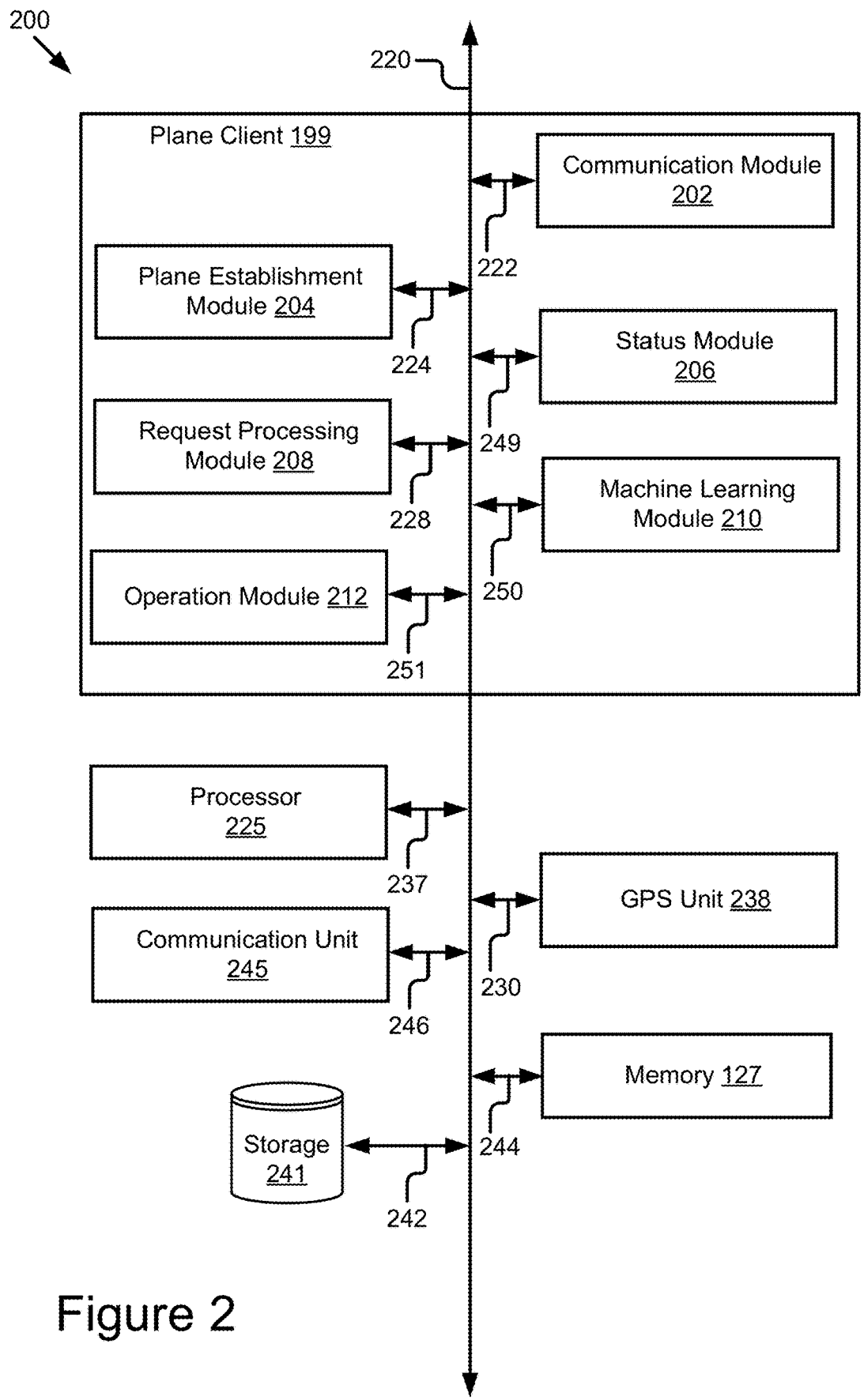
FIG. 2 is a block diagram illustrating an example computer system including a plane client according to some embodiments.

Referring now to FIG. 2, depicted is a block diagram illustrating an example computer system 200 including the plane client 199 according to some embodiments. In some embodiments, the computer system 200 may include a special-purpose computer system that is programmed to perform one or more steps of methods 300 and 400 described below with reference to FIGS. 3-4C.

For simplicity and convenience of description for FIG. 2, assume that: a vehicular macro cloud 102 includes multiple vehicular micro clouds 110; and the plane client 199 of FIG. 2 is installed in a first CP node 112 of a first vehicular micro cloud 110 within the vehicular macro cloud 102.

In some embodiments, the first CP node 112 includes at least a connected vehicle 121. The computer system 200 is an on-board vehicle computer of the connected vehicle 121. In some embodiments, the computer system 200 is an onboard unit of the connected vehicle 121. In some embodiments, the computer system 200 is an electronic control unit (ECU), head unit or some other processor-based computing device of the connected vehicle 121.

The computer system 200 may include one or more of the following elements according to some examples: the plane client 199; a processor 225; the memory 127; a communication unit 245; a GPS unit 238; and a storage 241. The components of the computer system 200 are communicatively coupled by a bus 220.

In the illustrated embodiment, the processor 225 is communicatively coupled to the bus 220 via a signal line 237. The communication unit 245 is communicatively coupled to the bus 220 via a signal line 246. The GPS unit 238 is communicatively coupled to the bus 220 via a signal line 230. The storage 241 is communicatively coupled to the bus 220 via a signal line 242. The memory 127 is communicatively coupled to the bus 220 via a signal line 244.

The memory 127 is described above with reference to FIG. 1C, and so, similar description will not be repeated here. The memory 127 may store any of the data described above with reference to FIGS. 1A-1E. The memory 127 may store any data necessary for the computer system 200 to provide its functionality.

The processor 225 includes an arithmetic logic unit, a microprocessor, a general-purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. The computer system 200 may include one or more processors 225. Other processors, operating systems, sensors, displays, and physical configurations may be possible.

The communication unit 245 transmits and receives data to and from the network 105 or to another communication channel. In some embodiments, the communication unit 245 may include a DSRC transceiver, a DSRC receiver and other hardware or software necessary to make the connected vehicle 121 a DSRC-enabled device. For example, the communication unit 245 includes a DSRC antenna configured to broadcast DSRC messages via the network. The DSRC antenna may also transmit BSM messages at a fixed interval (e.g., every 0.1 seconds, at a time interval corresponding to a frequency range from 1.6 Hz to 10 Hz, etc.) that is user configurable.

In some embodiments, the communication unit 245 includes a port for direct physical connection to the network 105 or to another communication channel. For example, the communication unit 245 includes a USB, SD, CAT-5, or similar port for wired communication with the network 105. In some embodiments, the communication unit 245 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, millimeter wave, DSRC, etc.

In some embodiments, the GPS unit 238 is a conventional GPS unit of the connected vehicle 121. For example, the GPS unit 238 may include hardware that wirelessly communicates with a GPS satellite to retrieve data that describes a geographic location of the connected vehicle 121. For example, the GPS unit 238 retrieves GPS data from one or more GPS satellites. In some embodiments, the GPS unit 238 is a DSRC-compliant GPS unit of the connected vehicle 121 that is operable to provide GPS data describing the geographic location of the connected vehicle 121 with lane-level accuracy.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the plane client 199 includes: a communication module 202; a plane establishment module 204; a status module 206; a request processing module 208; a machine learning module 210; and an operation module 212. These components of the plane client 199 are communicatively coupled to each other via the bus 220. In some embodiments, components of the plane client 199 can be stored in a single device. In some other embodiments, components of the plane client 199 can be distributed and stored across multiple devices. For example, some of the components of the plane client 199 may be distributed across the requester 141 and the connected vehicle 121.

The communication module 202 can be software including routines for handling communications between the plane client 199 and other components of the computer system 200. In some embodiments, the communication module 202 can be stored in the memory 127 of the computer system 200 and can be accessible and executable by the processor 225. The communication module 202 may be adapted for cooperation and communication with the processor 225 and other components of the computer system 200 via a signal line 222.

The communication module 202 sends and receives data, via the communication unit 245, to and from one or more elements of the operating environment 130 or 150. For example, the communication module 202 receives or transmits, via the communication unit 245, one or more of the following elements: status data; one or more data requests; and data content. The communication module 202 may send or receive any of the data or messages described above with reference to FIGS. 1A-1E via the communication unit 245.

In some embodiments, the communication module 202 receives data from components of the plane client 199 and stores the data in one or more of the storage 241 and the memory 127. For example, the communication module 202 receives data described above with reference to the memory 127 from the communication unit 245 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the plane client 199. For example, the communication module 202 may handle communications among the plane establishment module 204, the status module 206, the request processing module 208, the machine learning module 210 and the operation module 212. Any of these modules may cause the communication module 202 to communicate with the other elements of the computer system 200 or the operating environment 130 or 150 (via the communication unit 245).

The plane establishment module 204 can be software including routines for establishing one or more of a control plane and a data plane among the vehicular micro clouds 110 within the vehicular macro cloud 102. In some embodiments, the plane establishment module 204 can be stored in the memory 127 of the computer system 200 and can be accessible and executable by the processor 225. The plane establishment module 204 may be adapted for cooperation and communication with the processor 225 and other components of the computer system 200 via a signal line 224.

In some embodiments, the plane establishment module 204 of the plane client 199 (which is installed in the first CP node 112 of the first vehicular micro cloud 110) is operable to cooperate with one or more other CP nodes 112 of one or more other vehicular micro clouds 110 to establish a control plane and a data plane for the vehicular macro cloud 102. For example, the control plane is a distributed control plane and at least includes the first CP node 112 of the first vehicular micro cloud 110 and the one or more other CP nodes 112 of the one or more other vehicular micro clouds 110. The control plane and the data plane are described above with reference to FIGS. 1D-1E, and similar description is not repeated here.

The status module 206 can be software including routines that, when executed by the processor 225, cause the processor 225 to generate status data and resource data for the first CP node 112 of the first vehicular micro cloud 110. In some embodiments, the status module 206 can be a set of instructions stored in the memory 127 of the computer system 200 and can be accessible and executable by the processor 225. The status module 206 may be adapted for cooperation and communication with the processor 225 and other components of the computer system 200 via a signal line 249.

In some embodiments, the status module 206 is operable to generate first status data describing a status of the first vehicular micro cloud 110. The status module 206 applies the control plane to perform a status-data exchange in the vehicular macro cloud 102, including: sending the first status data to the one or more other CP nodes 112 of the one or more other vehicular micro cloud 110; and receiving one or more sets of status data describing one or more statuses of the one or more other vehicular micro clouds 110 from the one or more other CP nodes 112 respectively.

For example, the first status data includes data describing one or more of: a geographic location of the first vehicular micro cloud 110; a content list describing a list of data files stored by the first vehicular micro cloud 110 and information described by each data file; one or more computing resources available on the first vehicular micro cloud 110; one or more requests for data delivery that the first vehicular micro cloud 110 needs to fulfill; one or more requests for data replication that the first vehicular micro cloud 110 needs to fulfill; and one or more requests for data recovery that the first vehicular micro cloud 110 needs to fulfill.

Each set of the one or more other sets of status data may include digital data similar to the first status data, and similar description is not repeated here.

Periodically, the status module 206 cooperates with the one or more other CP nodes 112 to exchange status data with the one or more other CP nodes 112 of the vehicular macro cloud 102. The control plane is used for this exchange of status data. DSRC messages, such as Basic Safety Messages (BSM messages), may be used to distribute the status data among the various CP nodes 112. No existing solutions share similar status data among vehicular micro clouds, much less share such status data among the vehicular micro clouds using a control plane which is, for example, independent of a data plane.

While performing the status-data exchange process, the status module 206 measures network data including: (1) latency data describing one or more latency values of data delivery between the first CP node 112 and the one or more other CP nodes 112; and (2) packet data describing one or more packet delivery ratios between the first CP node 112 and the one or more other CP nodes 112.

Then, after performing the status-data exchange process, the status module 206 builds one or more status data structures including (and organizing) the one or more sets of status data received from the one or more other CP nodes 112, respectively.

The status module 206 generates resource data of the first vehicular micro cloud 110 that includes one or more of: the first status data of the first vehicular micro cloud 110; the one or more status data structures related to the one or more other vehicular micro clouds 110; and the network data including the latency data and the packet data.

For example, if V2X (e.g., V2V) communications are used for the status-data exchange process, then the status module 206 measures: (a) a latency (i.e., "latency data") and (b) a packet delivery ratio (i.e., "packet data") while executing the status-data exchange process. Then, the first CP node 112 potentially includes the following digital data which is collectively referred to as "resource data": (1) its own first status data; (2) the one or more status data structures including the status data of the one or more other CP nodes 112; (3) latency data measured while exchanging the status data; and (4) the packet data measured while exchanging the status data.

The request processing module 208 can be software including routines that, when executed by the processor 225, cause the processor 225 to process a data request and generate result data describing a processing result related to the data request. In some embodiments, the request processing module 208 can be a set of instructions stored in the memory 127 of the computer system 200 and can be accessible and executable by the processor 225. The request processing module 208 may be adapted for cooperation and communication with the processor 225 and other components of the computer system 200 via a signal line 228.

In some embodiments, the request processing module 208 is operable to: receive a data request from a requester via a V2X network; and analyze the data request using a control plane to select a target content provider for providing data content requested by the data request. For example, the request processing module 208 retrieves a content list from the first status data of the first vehicular micro cloud 110 and determines whether the data content requested by the data request is stored by the first vehicular micro cloud 110 based on the content list.

If the data content is stored by the first vehicular micro cloud 110, the request processing module 208 of the first CP node 112 answers the data request with a V2X wireless message that includes the requested data content as its payload. The request processing module 208 sends the V2X wireless message to the requester via the communication unit 245. In this case, the first CP node 112 of the first vehicular micro cloud 110 is the target content provider.

Responsive to the data content requested by the data request being not stored by the first vehicular micro cloud 110, the request processing module 208 analyzes the resource data of the first vehicular micro cloud 110 to determine a target content provider for providing the requested data content. In some embodiments, the request processing module 208 also analyzes the resource data of the first vehicular micro cloud 110 to determine one or more of: (1) a request-forward path to forward the data request to the target content provider; and (2) a data-forward path to forward the data content from the target content provider to the requester. The determination of the target content provider, the request-forward path and the data-forward path is described above with reference to FIGS. 1D-1E, and similar description is not repeated here.

Next, the request processing module 208 uses a data plane to process the data request. For example, the request processing module 208 uses the data plane to process the data request based on a decision made by the control plane. Specifically, the request processing module 208 uses the control plane to forward the data request received from the requester to the target content provider as a control message via the V2X network (e.g., the request processing module 208 forwards the data request to the target content provider according to the request-forward path determined on a level of the control plane). Upon receiving the data request, the target content provider provides the data content to the first CP node 112 using the data plane. Thus, the request processing module 208 of the first CP node 112 uses the data plane to receive the data content from the target content provider and to forward the data content to the requester via the V2X network (e.g., the target content provider provides the data content to the requester according to the data-forward path, where the data-forward path includes the first CP node 112 as a relay node where the requester can retrieve the data content).

The request processing module 208 is operable to generate result data describing a processing result of the data request. For example, the processing result indicates that: the data content requested by the data request is stored by the first vehicular micro cloud 110, and so, there is no need to retrieve the data content from other vehicular micro clouds 110. In another example, the processing result indicates that: the data content requested by the data request is not stored by the first vehicular micro cloud 110, and so, the data content is retrieved from another vehicular micro cloud 110. In some embodiments, the processing result may also include one or more of the following elements: a response time for completing the data request; the request-forward path; the data-forward path; the number of hops along the request-forward path; and the number of hops along the data-forward path, etc.

The machine learning module 210 can be software including routines that, when executed by the processor 225, cause the processor 225 to generate feedback data, analyze the feedback data and modify an operation of the first CP node 112 based on an analysis result of the feedback data. In some embodiments, the machine learning module 210 can be a set of instructions stored in the memory 127 of the computer system 200 and can be accessible and executable by the processor 225. The machine learning module 210 may be adapted for cooperation and communication with the processor 225 and other components of the computer system 200 via a signal line 250.

In some embodiments, the machine learning module 210 generates the feedback data that includes: (1) the result data describing the processing result of the data request; (2) control-plane data associated with the control plane; or (3) a combination thereof. In some embodiments, the control-plane data can include any digital data associated with the control plane and is incorporated into the feedback data. For example, the control-plane data includes one or more content lists of one or more vehicular micro clouds. In another example, the control-plane data includes data describing a status-data exchange process during which the status data is exchanged over the control plane (e.g., a time duration needed for completing the status-data exchange process across a particular portion of the vehicular macro cloud 102 or the entire vehicular macro cloud 102). The feedback data can be used to train the machine learning module 210 as described below.

In some embodiments, CP nodes 112 of different vehicular micro clouds 110 may exchange their respective feedback data with one another over the control plane so that efficiency of data management in the vehicular macro cloud 102 can be further improved. In this case, each individual CP node 112 can train its respective machine learning module 212 using not only its own feedback data but also other feedback data received from other CP nodes 112, which may improve the training efficiency as well as performance of the machine learning module 212 as a variety of feedback data can be used in the training process.

In some embodiments, the machine learning module 210 is operable to modify an operation of the first CP node 112 based on the feedback data so that a reduction including one or more of a latency of data delivery and a data packet loss for data requests processed by the first CP node 112 is achieved. This reduction of the latency of data delivery, the data packet loss or a combination thereof can improve over time as more feedback data is generated.

In some embodiments, the machine learning module 210 modifies an operation of the first CP node 112 based on the feedback data at least by: analyzing the feedback data to determine one or more types of popular data content; and modifying an operation of the communication unit 245 of the first CP node 112 so that the communication unit 245 prefetches and stores the one or more types of popular data content on the first CP node 112. For example, the machine learning module 210 monitors a frequency with which particular data content is requested (e.g., the machine learning module 210 counts the number of data requests for the particular data content and determines a popularity of the particular data content based on the number of data requests). In this way, the machine learning module 210 monitors the popularity of different data content and prefetches data content that is the most popular (e.g., data content with the highest requested frequencies). In this case, responsive to receiving data requests for any of the one or more types of popular data content, the first CP node 112 can respond to the data requests directly without forwarding the data requests to other vehicular micro clouds, so that the reduction of the latency of data delivery and the data packet loss for the data requests can be improved compared with the scenarios of forwarding the data requests to other vehicular micro clouds for retrieval of the data content.

In some embodiments, the machine learning module 210 modifies an operation of the first CP node 112 based on the feedback data at least by: modifying an operation of the communication unit 245 of the first CP node 112 so that the communication unit 245 caches the data content on the first CP node 112 based on the feedback data. For example, responsive to the feedback data indicating that the number of data requests for a piece of data content exceeds a threshold, the machine learning module 210 instructs the communication unit 245 to cache the piece of data content on the first CP node 112. In this case, responsive to receiving additional data requests for the piece of data content, the first CP node 112 can respond to the data requests directly without forwarding the data requests to other vehicular micro clouds, so that the reduction of the latency of data delivery and the data packet loss for the data requests can be improved compared with the scenarios of forwarding the data requests to other vehicular micro clouds for retrieval of the piece of data content.

In some examples, a modification of an operation of the communication unit 245 includes one or more of: a modification on a number of active V2X channels to be operated on (e.g., a modification on a number of active V2X transceivers or a number of active V2X radios to be operated on); a modification on operating frequencies of the active V2X channels; a modification on beamforming techniques applied on the V2X antennas; and a modification on bandwidth allocation of the communication unit 245, etc. For example, responsive to an amount of the popular data content to be prefetched from other vehicular micro clouds 110 exceeding a threshold, the machine learning module 210 can perform one or more of the following operations: increasing the number of active V2X channels so that more V2X channels can be used to prefetch the popular data content simultaneously; changing a beamforming technique applies on the V2X antennas so that the popular data content can be received at the communication unit 245 with a higher signal-to-noise ratio; and allocating more bandwidth to the communication unit 245 so that the popular data content can be retrieved in a faster speed, etc.

In some embodiments, the machine learning module 210 utilizes one or more machine learning techniques (e.g., a deep learning technique, a neural network, etc.) to analyze the feedback data.

In some embodiments, the machine learning module 210 utilizes a learning algorithm to build the feedback data into a learning database so that the latency of data delivery and the packet loss ratio over the V2X network can be reduced as the learning database stores increasing instances of feedback data (herein, "more and more feedback data"). For example, the machine learning module 210 can build an item of the learning database to include the data request, the response time for completing the data request, the requested data content, and the feedback data, etc. As more and more feedback data is received, more and more items of the learning database can be built. Then, the items in the learning database can be used as training data for training the one or more machine learning techniques used to analyze the feedback data.

In some embodiments, the machine learning module 210 utilizes a learning algorithm and the feedback data is provided as an input to the learning algorithm. As more and more feedback data is received as time elapses, the learning algorithm recursively analyzes the feedback data and improves the operation of the first CP node 112 over time based on the feedback data that is received. For example, the machine learning module 210 of the first CP node 112 predicts which data content needs to be prefetched based on the learning algorithm's analysis of the feedback data and modifies the operation of the communication unit 245 (e.g., a V2X antenna of the communication unit 245) to cause the predicted data content to be prefetched. In this case, the operation of the first CP node 112 as well as the communication unit 245 (e.g., the V2X antenna) is improved.

In some embodiments, based on the feedback data, the machine learning module 210 changes a resource allocation scheme of the first CP node 112 (e.g., a computing power allocation scheme, a memory allocation scheme, or a bandwidth allocation scheme, etc.), so that resource (e.g., computing power, memory space, bandwidth, etc.) can be allocated for performing the data prefetching and the data caching. For example, memory space that stores unpopular data content can be released and new memory space can be allocated for storing popular data content. With respect to a network bandwidth allocation, responsive to an instruction to prefetch some data content, the machine learning module 210 monitors a load of the V2X network and modifies an operation of the communication unit 245 to prefetch the data content when bandwidth is available on the V2X network. If the load of the V2X network exceeds a threshold, the machine learning module 210 modifies an operation of the communication unit 245 so that less bandwidth is allocated for the data prefetching.

The operation module 212 can be software including routines that, when executed by the processor 225, cause the processor 225 to perform a data operation on the first CP node 112. In some embodiments, the operation module 212 can be a set of instructions stored in the memory 127 of the computer system 200 and can be accessible and executable by the processor 225. The operation module 212 may be adapted for cooperation and communication with the processor 225 and other components of the computer system 200 via a signal line 251.

In some embodiments, the operation module 212 is operable to monitor a data replication triggering event in the first vehicular micro cloud 110. Responsive to occurrence of the data replication triggering event, the operation module 212 replicates data of the first vehicular micro cloud 110 to another vehicular micro cloud 110 in the vehicular macro cloud 102. For example, the data replication triggering event includes one or more of: a number of vehicles in the first vehicular micro cloud 110 is below a first threshold; and an amount of data storage resources available in the first vehicular micro cloud 110 is below a second threshold.

For example, when the amount of data storage resources available in the first vehicular micro cloud 110 is expected to drop below a pre-defined threshold in a short period of time (e.g., in the next 30 minutes, 1 hour, etc.) and a piece of data content is cached by only a limited number of vehicular micro clouds, the operation module 212 of the first CP node 112 can instruct to replicate the piece of data content to one or more other vehicular micro clouds 110 as backups. The operation module 212 selects the one or more other vehicular micro clouds 110 to which the first vehicular micro cloud 110 hands over the piece of data content based on metadata exchanged over the control plane. For example, the one or more other vehicular micro clouds 110 are determined based on one or more of: data storage resources available in each candidate vehicular micro cloud 110; and a distance from the first vehicular micro cloud 110 to each candidate vehicular micro cloud 110 (e.g., a distance between the first CP node 112 and a CP node 112 of each candidate vehicular micro cloud 110). For example, a candidate vehicular micro cloud 110 with a highest amount of data storage resources available or a shortest distance can be selected to perform the data replication operation.

In some embodiments, the operation module 212 determines that a set of data content is lost in the first vehicular micro cloud 110 and obtains the set of data content from another vehicular micro cloud 110 in the vehicular macro cloud 102 to recover the set of data content in the first vehicular micro cloud 110. For example, when a piece of data content is lost from the first vehicular micro cloud 110 (e.g., due to vehicle mobility, loss of packets, etc.), the operation module 212 of the first CP node 112 looks up one or more status data structures in its resource data and searches for another CP node 112 whose content list includes the piece of data content based on the one or more status data structures. The operation module 212 requests the other CP node 112 to provide the lost piece of data content over the V2X network. For example, similar to performing operations to process a data request by the request processing module 208, the operation module 212 of the first CP node 112 identifies a target content provider for providing the piece of data content based on the one or more status data structures and network statistics data collected on the control plane. The operation module 212 requests the target content provider to provide the piece of data content.

Example Processes

Figure 3:
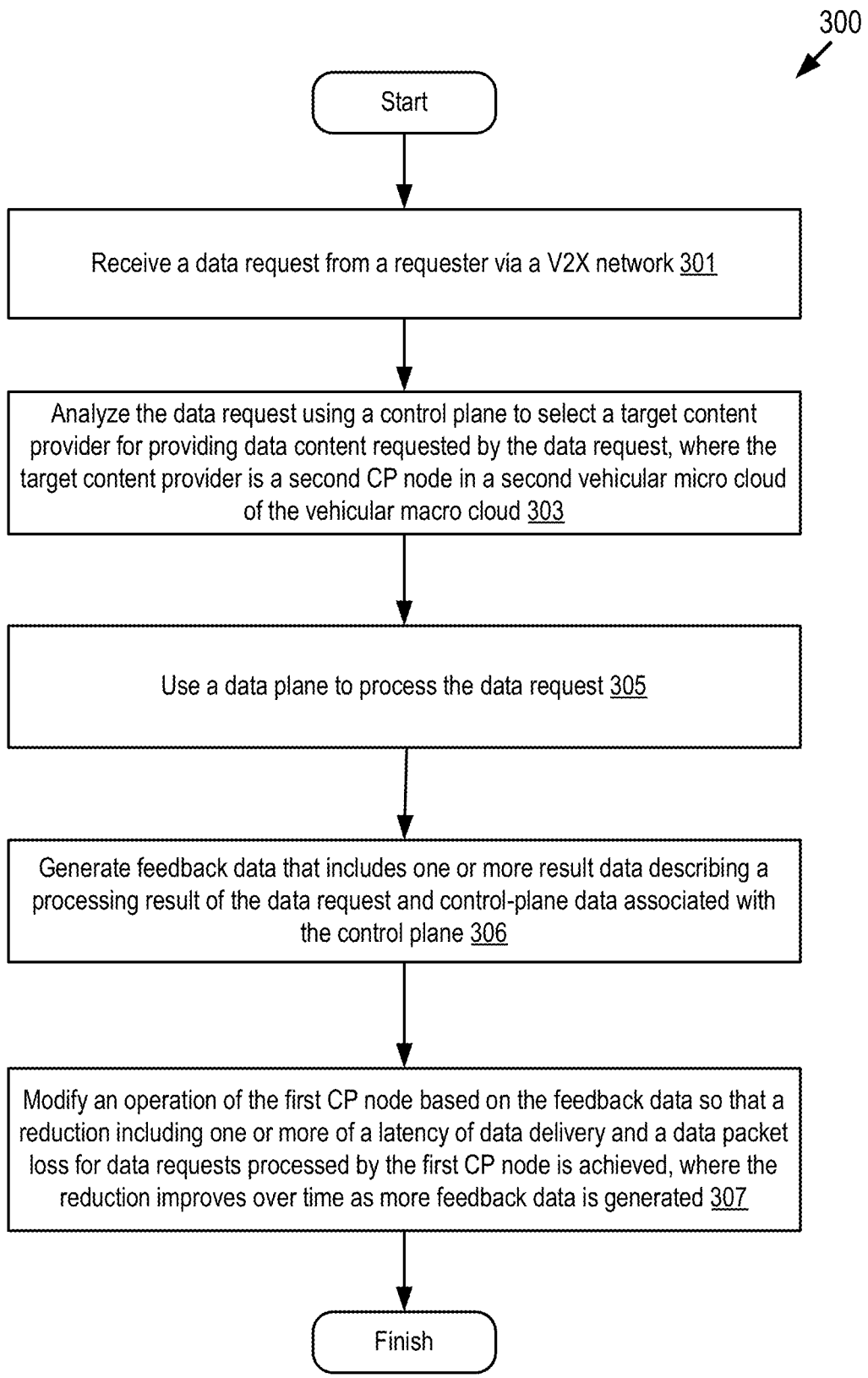
FIG. 3 depicts a method for improving wireless communications among a set of vehicular micro clouds within a vehicular macro cloud according to some embodiments.

Referring now to FIG. 3, depicted is a flowchart of an example method 300 for improving wireless communications among a set of vehicular micro clouds 110 within a vehicular macro cloud 102 according to some embodiments. The steps of the method 300 are executable in any order, and not necessarily the order depicted in FIG. 3. Here, assume that the method 300 is performed by a first CP node 112 of a first vehicular micro cloud 110.

At step 301, the communication module 202 receives a data request from a requester via a V2X network.

At step 303, the request processing module 208 analyzes the data request using a control plane to select a target content provider for providing data content requested by the data request, where the target content provider is a second CP node 112 in a second vehicular micro cloud 110 of the vehicular macro cloud 102.

At step 305, the request processing module 208 uses a data plane to process the data request.

At step 306, the machine learning module 210 generates feedback data that includes one or more of result data describing a processing result of the data request and control-plane data associated with the control plane.

At step 307, the machine learning module 210 modifies an operation of the first CP node 112 based on the feedback data so that a reduction including one or more of a latency of data delivery and a data packet loss for data requests processed by the first CP node 112 is achieved, where the reduction improves over time as more feedback data is generated.

Figure 4A:
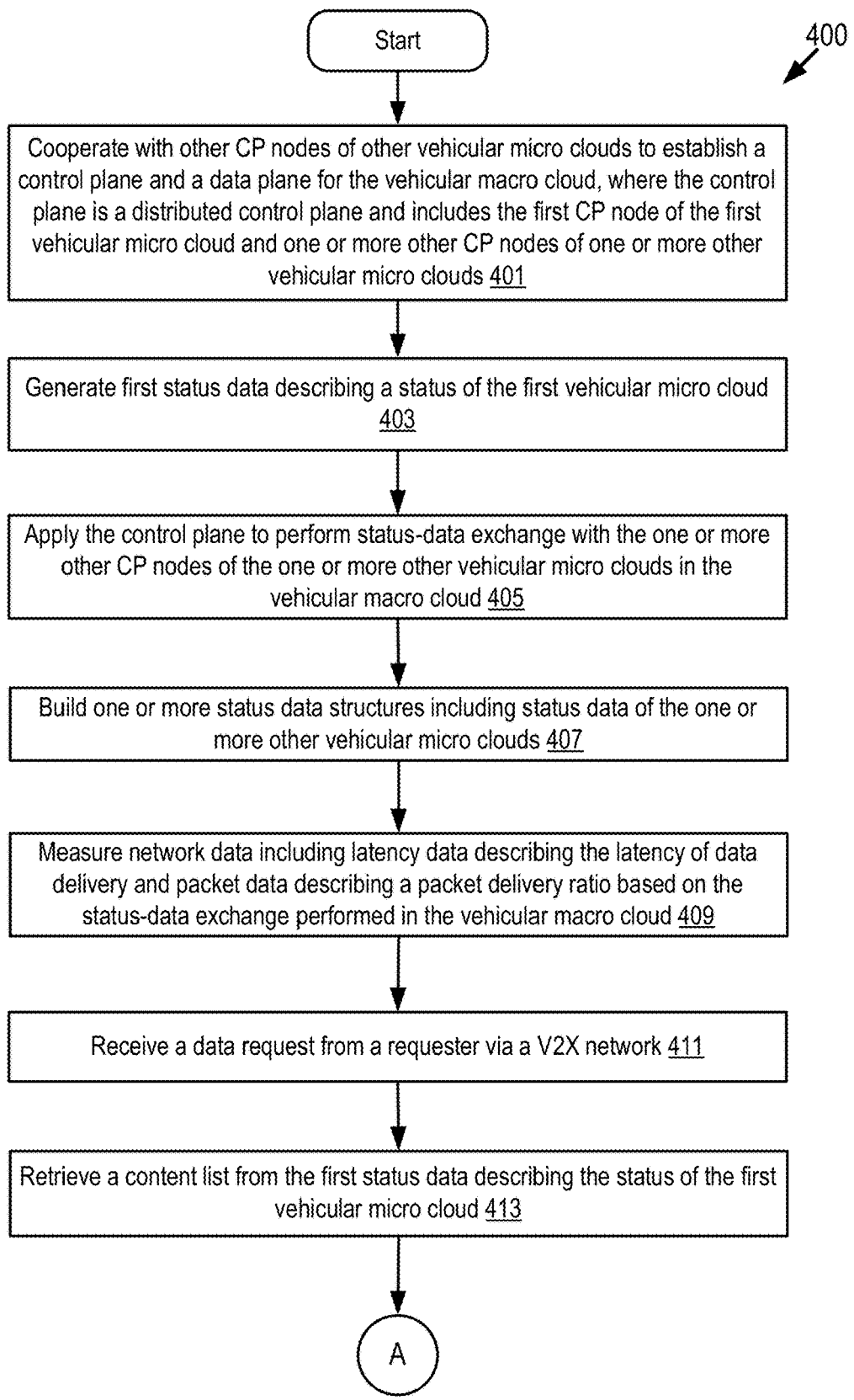
FIGS. 4A-4C depict another method for improving wireless communications among a set of vehicular micro clouds within a vehicular macro cloud according to some embodiments.
Figure 4B:
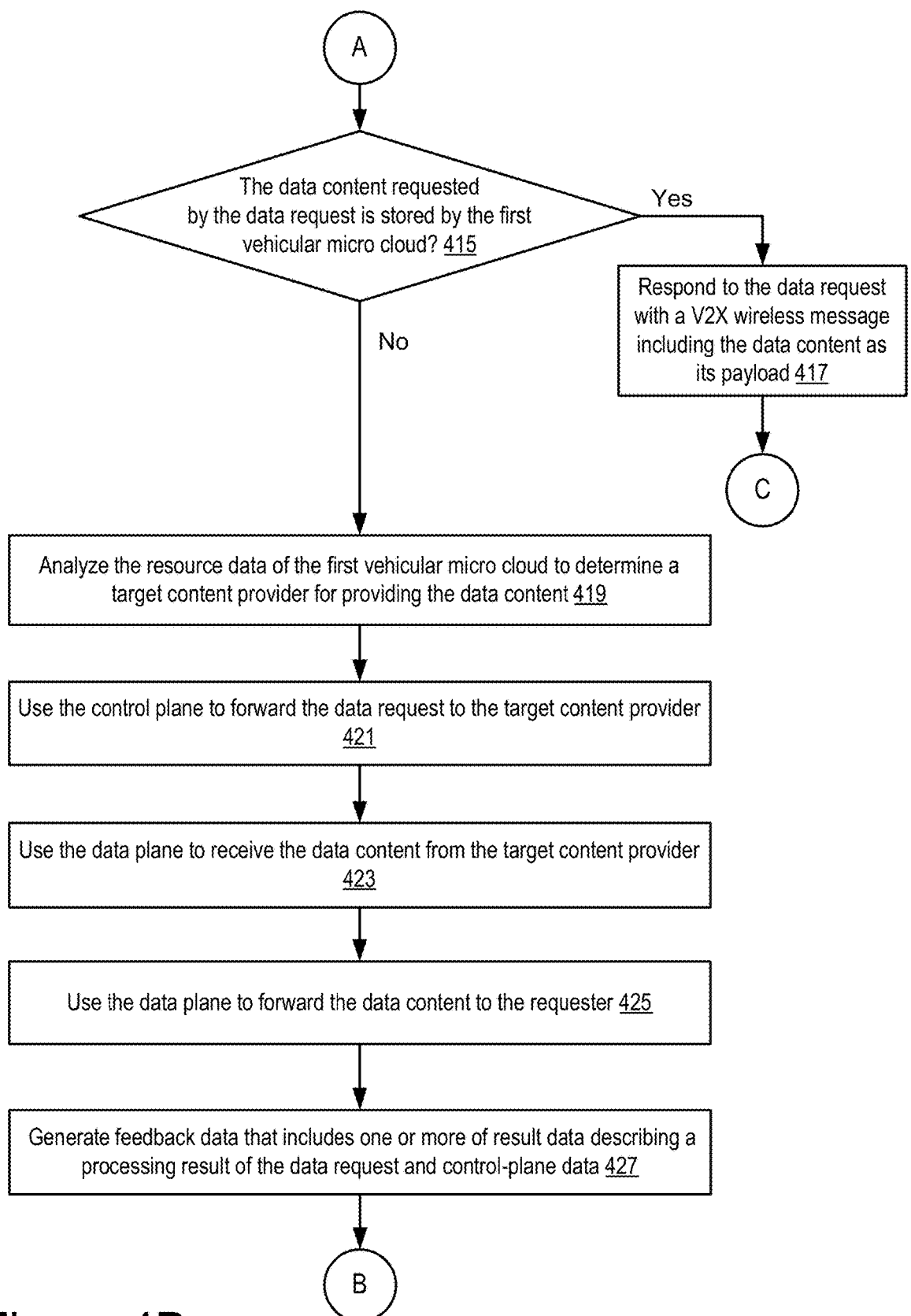
Figure 4C:
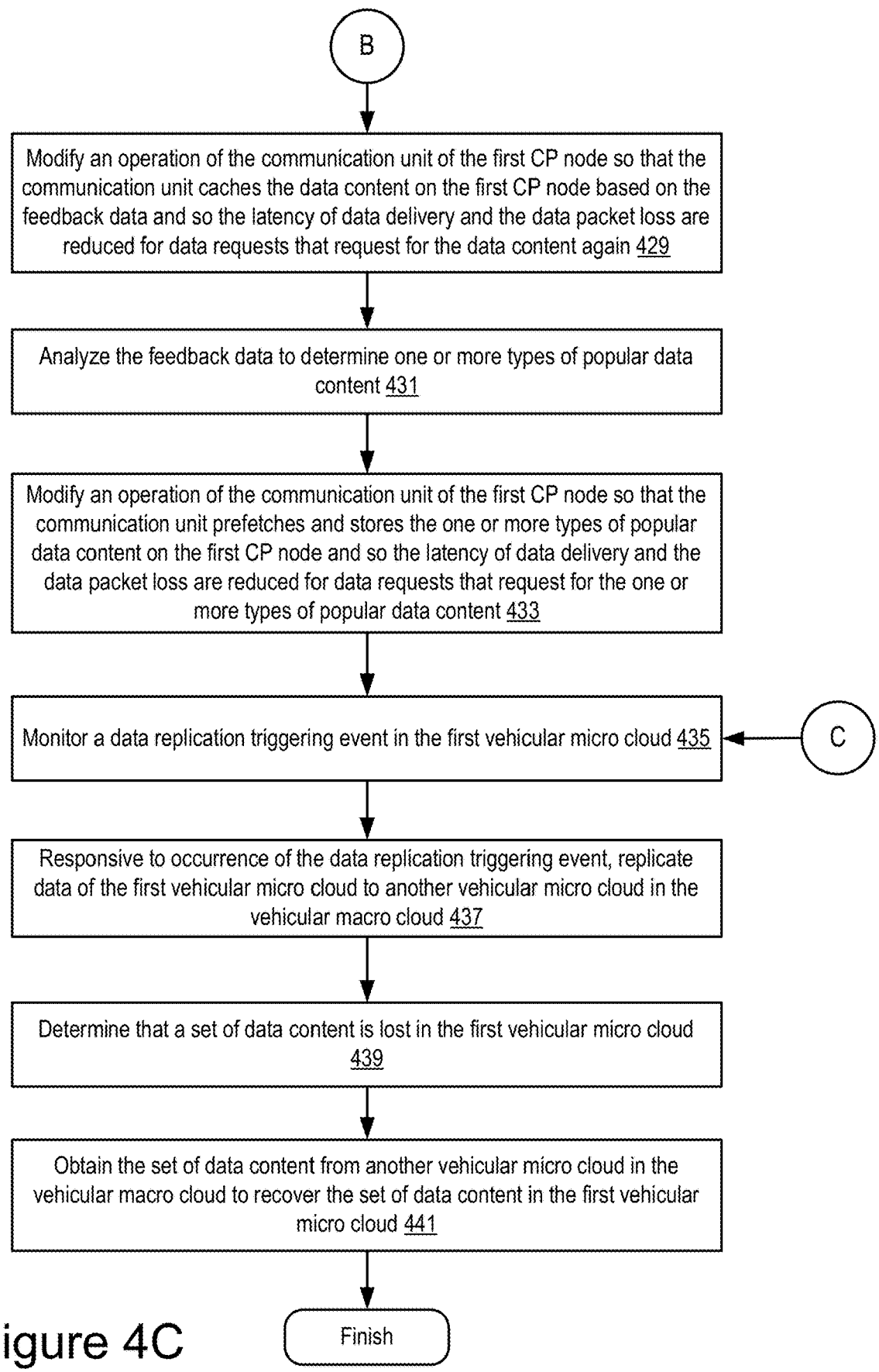

FIGS. 4A-4C depicts another method 400 for improving wireless communications among a set of vehicular micro clouds 110 within a vehicular macro cloud 102 according to some embodiments. The steps of the method 400 are executable in any order, and not necessarily the order depicted in FIGS. 4A-4C. Here, assume that the method 400 is performed by a first CP node 112 of a first vehicular micro cloud 110.

Referring to FIG. 4A, at step 401, the plane establishment module 204 cooperates with other CP nodes 112 of other vehicular micro clouds 110 to establish a control plane and a data plane for the vehicular macro cloud 102, where the control plane is a distributed control plane and includes the first CP node 112 of the first vehicular micro cloud 110 and one or more other CP nodes 112 of one or more other vehicular micro clouds 110.

At step 403, the status module 206 generates first status data describing a status of the first vehicular micro cloud 110.

At step 405, the status module 206 applies the control plane to perform status-data exchange with the one or more other CP nodes 112 of the one or more other vehicular micro clouds 110 in the vehicular macro cloud 102.

At step 407, the status module 206 builds one or more status data structures including status data of the one or more other vehicular micro clouds 110.

At step 409, the status module 206 measures network data including latency data describing the latency of data delivery and packet data describing a packet delivery ratio based on the status-data exchange performed in the vehicular macro cloud 102.

At step 411, the request processing module 208 receives a data request from a requester via a V2X network.

At step 413, the request processing module 208 retrieves a content list from the first status data describing the status of the first vehicular micro cloud 110.

Referring to FIG. 4B, at step 415, the request processing module 208 determines whether the data content requested by the data request is stored by the first vehicular micro cloud 110. Responsive to the data content requested by the data request being stored by the first vehicular micro cloud 110, the method 400 moves to step 417. Otherwise, the method 400 moves to step 419.

At step 417, the request processing module 208 responds to the data request with a V2X wireless message including the data content as its payload. Then, the method continues to step 435 at FIG. 4C.

At step 419, the request processing module 208 analyzes the resource data of the first vehicular micro cloud 110 to determine a target content provider for providing the data content.

At step 421, the request processing module 208 uses the control plane to forward the data request received from the requester to the target content provider via the V2X network.

At step 423, the request processing module 208 uses the data plane to receive the data content from the target content provider via the V2X network.

At step 425, the request processing module 208 uses the data plane to forward the data content received from the target content provider to the requester via the V2X network.

At step 427, the machine learning module 210 generates feedback data that includes one or more of result data describing a processing result of the data request and control-plane data associated with the control plane.

Turning to FIG. 4C, at step 429, the machine learning module 210 modifies an operation of the communication unit 245 of the first CP node 112 so that the communication unit 245 caches the data content on the first CP node 112 based on the feedback data. Thus, the latency of data delivery and the data packet loss are reduced for data requests that request for the data content again.

At step 431, the machine learning module 210 analyzes the feedback data to determine one or more types of popular data content.

At step 433, the machine learning module 210 modifies an operation of the communication unit 245 of the first CP node 112 so that the communication unit 245 prefetches and stores the one or more types of popular data content on the first CP node 112. Thus, the latency of data delivery and the data packet loss are reduced for data requests that request for the one or more types of popular data content.

At step 435, the operation module 212 monitors a data replication triggering event in the first vehicular micro cloud 110.

At step 437, responsive to occurrence of the data replication triggering event, the operation module 212 replicates data of the first vehicular micro cloud 110 to another vehicular micro cloud 110 in the vehicular macro cloud 102.

At step 439, the operation module 212 determines that a set of data content is lost in the first vehicular micro cloud 110.

At step 441, the operation module 212 obtains the set of data content from another vehicular micro cloud 110 in the vehicular macro cloud 102 to recover the set of data content in the first vehicular micro cloud 110.

Figure 5:
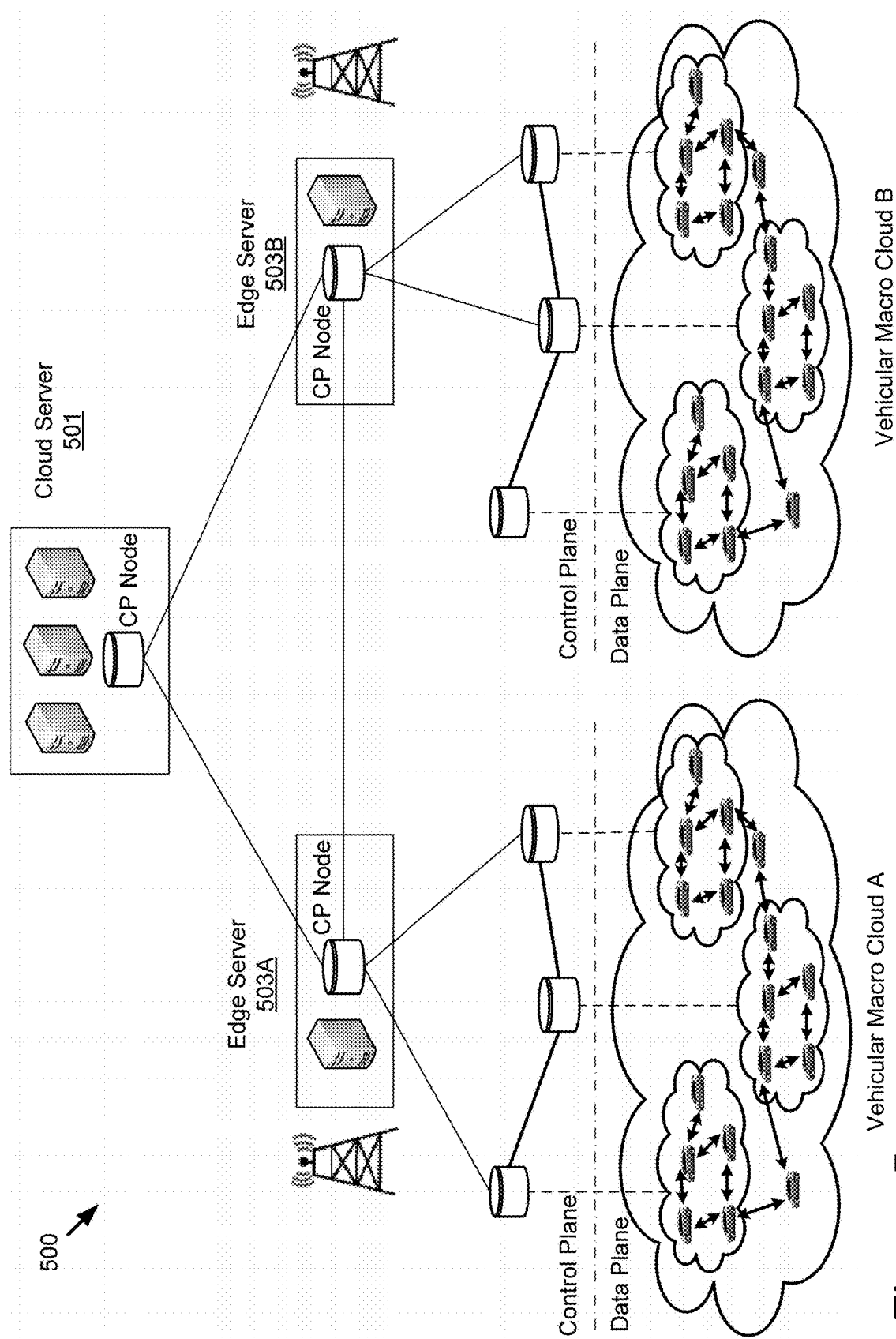
FIG. 5 is a graphical representation illustrating an example structure for bridging isolated vehicular macro clouds according to some embodiments.

FIG. 5 is a graphical representation illustrating an example structure 500 for bridging isolated vehicular macro clouds 102 according to some embodiments. For example, V2V networks are usually isolated from one another at areas with a low vehicle density, resulting in multiple isolated vehicular macro clouds 102. In this case, a vehicular macro cloud 102 cannot reach another vehicular macro cloud 102 over V2V networks. With reference to FIG. 5, a vehicular macro cloud A is not reachable by a vehicular macro cloud B over V2V networks.

In some embodiments, cloud servers 501, edge servers 503 (503A, 503B) or a combination thereof in a backbone network can each host a CP node 112 to bridge this gap among the isolated vehicular macro clouds 102. A data plane established thereof may also use V2N communications for data transfer across the vehicular macro clouds 102.

FIGS. 6A and 6B are graphical representations illustrating example DSRC data 600 according to some embodiments. DSRC messages may be used to distribute status data among the CP nodes 112 using the distributed control plane. Examples of the DSRC data 600 are depicted in FIGS. 6A-6B. DSRC messages are just one example of V2X wireless communications that may be used to distribute the status data according to some embodiments. Any other wireless communication technique may be used to distribute the status data. As such, any routing protocol that works over any wireless media can be used to distribute the status data to other vehicular micro clouds 110 that are more than one-hop away from the given vehicular micro cloud 110.

Vehicles are increasingly equipped with DSRC. DSRC-equipped vehicles may broadcast a DSRC message at an adjustable rate of once every 0.10 seconds. For example, the DSRC-equipped vehicle may transmit Basic Safety Messages (BSM messages). These BSM messages include DSRC data. The BSM messages may be used to transmit the status data among the CP nodes 112 of a vehicular macro cloud 102. FIG. 6A depicts a block diagram illustrating some of the DSRC data that is included in each BSM message.

The following is a summary of the content of FIG. 6B. Part 1 of the DSRC message includes core data elements, including a vehicle position, heading, speed, acceleration, steering wheel angle, and vehicle size. The DSRC message is transmitted at an adjustable rate of about 10 times per second.

Part 2 of the DSRC message includes a variable set of data elements drawn from an extensive list of optional elements. Some of them are selected based on event triggers, e.g., ABS activated. They are added to Part 1 and sent as part of the DSRC message, but many are transmitted less frequently in order to conserve bandwidth. The DSRC message includes only current snapshots (with the exception of path data which is itself limited to a few second's worth of past history data).

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for a first control plane (CP) node in a first vehicular micro cloud of a vehicular macro cloud, comprising:
analyzing a data request using a CP to select a target content provider for providing popular data content, wherein the target content provider is a second CP node in a second vehicular micro cloud of the vehicular macro cloud and wherein the popular data content is defined as popular based on a number of requests for the popular data content exceeding a threshold number;
modifying an operation of a communication unit of the first CP node based on feedback data so that the communication unit prefetches and stores the popular data content on the first CP node to achieve a reduction including one or more of a latency of data delivery or a data packet loss for data requests processed by the first CP node is achieved;
generating a prediction that an amount of data storage resources available will drop below a pre-defined threshold within a pre-determined period of time; and
responsive to generating the prediction, replicating data of the first vehicular micro cloud to another vehicular micro cloud in the vehicular macro cloud.

2. The method of claim 1, further comprising:
generating the feedback data that includes one or more of result data describing a processing result of the data request or CP data associated with the CP; and
analyzing the feedback data to determine one or more types of popular data content;
wherein the communication unit prefetches and stores the one or more types of popular data content on the first CP node.

3. The method of claim 1, wherein:
the data requests processed by the first CP node are requests for the popular data content again; and
modifying the operation of the communication unit of the first CP node includes caching the popular data content on the first CP node based on the feedback data to achieve the reduction of the one or more of the latency of data delivery or the data packet loss for the data requests.

4. The method of claim 1, further comprising:
using a data plane to process the data request;
generating the feedback data that includes one or more of result data describing a processing result of the data request or CP data associated with the CP; and
cooperating with at least the second CP node of the second vehicular micro cloud to establish the CP and the data plane for the vehicular macro cloud, wherein the CP is a distributed CP and at least includes the first CP node of the first vehicular micro cloud and the second CP node of the second vehicular micro cloud.

5. The method of claim 1, wherein:
the CP is used for handling a control type of distributed Vehicle-to-Everything (V2X) communications among vehicular micro clouds of the vehicular macro cloud and member vehicles of the vehicular micro clouds; and
a data plane processes the data request by handling a data-delivery type of distributed V2X communications among the vehicular micro clouds of the vehicular macro cloud and the member vehicles of the vehicular micro clouds.

6. The method of claim 1, further comprising:
generating first status data describing a status of the first vehicular micro cloud; and
applying the CP to perform a status-data exchange in the vehicular macro cloud, including:
sending the first status data to the second CP node of the second vehicular micro cloud; and
receiving second status data describing a status of the second vehicular micro cloud from the second CP node of the second vehicular micro cloud.

7. The method of claim 6, wherein the first status data includes data describing one or more of: a geographic location of the first vehicular micro cloud; a content list describing a list of data files stored by the first vehicular micro cloud and information described by each data file; one or more computing resources available on the first vehicular micro cloud; one or more requests for data delivery that the first vehicular micro cloud needs to fulfill; one or more requests for data replication that the first vehicular micro cloud needs to fulfill; or one or more requests for data recovery that the first vehicular micro cloud needs to fulfill.

8. The method of claim 6, further comprising:
measuring network data including latency data describing the latency of data delivery and packet data describing a packet delivery ratio based on the status-data exchange performed in the vehicular macro cloud; and
generating resource data of the first vehicular micro cloud that includes one or more of: the first status data of the first vehicular micro cloud; a status data structure including the second status data of the second vehicular micro cloud; or the network data including the latency data and the packet data.

9. The method of claim 1, wherein analyzing the data request using the CP to select the target content provider comprises:
retrieving a content list from first status data describing a status of the first vehicular micro cloud to determine whether the popular data content requested by the data request is stored by the first vehicular micro cloud; and
responsive to the popular data content requested by the data request being not stored by the first vehicular micro cloud, analyzing resource data of the first vehicular micro cloud to determine that the target content provider is the second CP node of the second vehicular micro cloud.

10. The method of claim 9, wherein the target content provider is the second CP node of the second vehicular micro cloud that satisfies one or more of: the second CP node stores the popular data content in a storage device of the second vehicular micro cloud; the second CP node has a smallest distance to the first CP node compared to one or more other CP nodes of one or more other vehicular micro clouds in the vehicular macro cloud; the second CP node has a smallest latency to the first CP node compared to the one or more other CP nodes; or the second CP node has a highest packet delivery ratio to the first CP node compared to the one or more other CP nodes.

11. The method of claim 1, wherein a data plane processes the data request:
based on a decision made by the CP.

12. The method of claim 11, wherein the data request is forwarded to the target content provider over the CP as a control message via a Vehicle-to-Everything (V2X) network, and the data plane processes the data request based on the decision made by the CP by:
  using the data plane to receive the popular data content from the target content provider via the V2X network; and
  using the data plane to forward the popular data content received from the target content provider to a requester that sends the data request via the V2X network.

13. The method of claim 1, wherein the another vehicular micro cloud is instructed to replicate the data based on a distance from the first vehicular micro cloud to the another vehicular micro cloud.

14. The method of claim 1, further comprising:
  determining that a set of data content is lost in the first vehicular micro cloud; and
  obtaining the set of data content from the another vehicular micro cloud in the vehicular macro cloud to recover the set of data content in the first vehicular micro cloud.

15. The method of claim 1, wherein the first CP node of the first vehicular micro cloud includes a vehicle of the first vehicular micro cloud or multiple vehicles of the first vehicular micro cloud that work collaboratively to provide functionality of the first CP node.

16. A system comprising:
  an onboard vehicle computer system of a connected vehicle that acts as a first control plane (CP) node of a first vehicular micro cloud in a vehicular macro cloud, including a communication unit, a processor and a non-transitory memory storing computer code which, when executed by the processor, causes the processor to:
    analyze a data request using a CP to select a target content provider for providing popular data content, wherein the target content provider is a second CP node in a second vehicular micro cloud of the vehicular macro cloud and wherein the popular data content is defined as popular based on a number of requests for the popular data content exceeding a threshold number;
    modify an operation of the communication unit of the first CP node based on feedback data so that the communication unit prefetches and stores the popular data content on the first CP node to achieve a reduction including one or more of a latency of data delivery or a data packet loss for data requests processed by the first CP node is achieved;
    generate a prediction that an amount of data storage resources available will drop below a pre-defined threshold within a pre-determined period of time; and
    responsive to generating the prediction, replicate data of the first vehicular micro cloud to another vehicular micro cloud in the vehicular macro cloud.

17. The system of claim 16, wherein the computer code, when executed by the processor, causes the processor further to:
  use a data plane to process the data request;
  generate feedback data that includes one or more of result data describing a processing result of the data request or CP data associated with the CP; and
  cooperate with at least the second CP node of the second vehicular micro cloud to establish the CP and the data plane for the vehicular macro cloud, wherein the CP is a distributed CP and at least includes the first CP node of the first vehicular micro cloud and the second CP node of the second vehicular micro cloud.

18. The system of claim 16, wherein:
  the CP is used for handling a control type of distributed V2X communications among vehicular micro clouds of the vehicular macro cloud and member vehicles of the vehicular micro clouds; and
  a data plane processes the data request by handling a data-delivery type of distributed V2X communications among the vehicular micro clouds of the vehicular macro cloud and the member vehicles of the vehicular micro clouds.

19. A computer program product comprising a non-transitory memory storing computer-executable code that, when executed by a processor of a first control plane (CP) node in a first vehicular micro cloud of a vehicular macro cloud, causes the processor to:
  analyze a data request using a CP to select a target content provider for providing popular data content requested by the data request, wherein the target content provider is a second CP node in a second vehicular micro cloud of the vehicular macro cloud and wherein the popular data content is defined as popular based on a number of requests for the popular data content exceeding a threshold number;
  modify an operation of a communication unit of the first CP node based on feedback data so that the communication unit prefetches and stores the popular data content on the first CP node to achieve a reduction including one or more of a latency of data delivery or a data packet loss for data requests processed by the first CP node is achieved;
  generate a prediction that an amount of data storage resources available will drop below a pre-defined threshold within a pre-determined period of time; and
  responsive to generating the prediction, replicate data of the first vehicular micro cloud to another vehicular micro cloud in the vehicular macro cloud.

20. The computer program product of claim 19, wherein the computer code, when executed by the processor, causes the processor further to:
  use a data plane to process the data request;
  generate feedback data that includes one or more of result data describing a processing result of the data request or CP data associated with the CP; and
  cooperate with at least the second CP node of the second vehicular micro cloud to establish the CP and the data plane for the vehicular macro cloud, wherein the CP is a distributed CP and at least includes the first CP node of the first vehicular micro cloud and the second CP node of the second vehicular micro cloud.

* * * * *